United States Patent
Stenfelt et al.

(10) Patent No.: US 9,560,212 B2
(45) Date of Patent: Jan. 31, 2017

(54) ENHANCED QOS CONTROL IN PCRF

(71) Applicant: TELEFONAKTIEBOLAGET L M ERICSSON (PUBL), Stockholm (SE)

(72) Inventors: John Stenfelt, Göteborg (SE); Fabian Castro Castro, Madrid (ES)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/784,486

(22) PCT Filed: Apr. 15, 2013

(86) PCT No.: PCT/EP2013/057776
§ 371 (c)(1),
(2) Date: Oct. 14, 2015

(87) PCT Pub. No.: WO2014/169933
PCT Pub. Date: Oct. 23, 2014

(65) Prior Publication Data
US 2016/0080578 A1 Mar. 17, 2016

(51) Int. Cl.
*H04M 15/00* (2006.01)
*H04L 12/24* (2006.01)
(Continued)

(52) U.S. Cl.
CPC .......... *H04M 15/66* (2013.01); *H04L 41/0893* (2013.01); *H04L 41/5025* (2013.01);
(Continued)

(58) Field of Classification Search
CPC ..... H04M 15/66; H04W 8/20; H04L 65/1066; H04L 67/306; H04L 47/41; H04L 47/20; H04L 41/5054; H04L 41/0893; H04L 41/5025; H04L 47/14; Y02B 60/33
See application file for complete search history.

(56) References Cited

U.S. PATENT DOCUMENTS

2009/0052384 A1* 2/2009 Zisimopoulous ....... H04L 47/14
370/329
2009/0262707 A1 10/2009 Wu et al.
(Continued)

OTHER PUBLICATIONS

"3rd Generation Partnership Project; Technical Specification Group Services and System Aspects; General Packet Radio Service (GPRS); Service description; Stage 2 (Release 11)" 3GPP TS 23.060 V11.4.0, Dec. 2012, 335 pages.
(Continued)

*Primary Examiner* — Chuong A Ngo
(74) *Attorney, Agent, or Firm* — Rothwell, Figg, Ernst, & Manbeck, P.C.

(57) ABSTRACT

The embodiments herein relate to a method in a Policy and Charging Rules Function, PCRF, node (320), for handling User Equipment-Aggregated Maximum Bit Rate, UE-AMBR, for a wireless device (305) in a communications network (300). The PCRF node (320) comprises a direct interface (317) with a Mobility Management Entity/Serving General packet radio service Support Node, MME/SGSN (308). The PCRF node (320) receives a subscribed UE-AMBR from the MME/SGSN (308) using the direct interface (317). The subscribed UE-AMBR is associated with a wireless device subscription. When triggered, the PCRF node (320) calculates a UE-AMBR based on the subscribed UE-AMBR and based policies associated with the wireless device (305). The PCRF node (320) transmits the calculated UE-AMBR to the MME/SGSN (308) using the direct interface (317).

28 Claims, 11 Drawing Sheets

(51) Int. Cl.
*H04L 29/08* (2006.01)
*H04L 12/891* (2013.01)
*H04L 12/801* (2013.01)
*H04L 12/813* (2013.01)
*H04L 29/06* (2006.01)
*H04W 8/20* (2009.01)

(52) U.S. Cl.
CPC .......... *H04L 41/5054* (2013.01); *H04L 47/14* (2013.01); *H04L 47/20* (2013.01); *H04L 47/41* (2013.01); *H04L 65/1066* (2013.01); *H04L 67/306* (2013.01); *H04W 8/20* (2013.01); *Y02B 60/33* (2013.01)

(56) References Cited

U.S. PATENT DOCUMENTS

| 2009/0316656 | A1 | 12/2009 | Zhao et al. | |
|---|---|---|---|---|
| 2010/0110989 | A1* | 5/2010 | Wu | H04L 47/10 370/328 |
| 2012/0030331 | A1* | 2/2012 | Karampatsis | H04L 41/0893 709/223 |

OTHER PUBLICATIONS

"3rd Generation Partnership Project; Technical Specification Group Services and System Aspects; Policy and charging control architecture (Release 11)" 3GPP TS 23.203 V11.5.0, Mar. 2012, 175 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 11)" 3GPP TS 23.401 V11.4.0, Dec. 2012, 284 pages.

International Search Report and Written Opinion issued in corresponding International Application No. PCT/EP2013/057776, dated Dec. 20, 2013, 7 pages.

* cited by examiner

Fig. 5 Attach/Primary PDP-context activation

Fig. 6 Concurrent sessions of the same wireless device

Fig. 7 Reauthorization upon subscriber profile change or other internal event

ENHANCED QOS CONTROL IN PCRF

CROSS REFERENCE TO RELATED APPLICATION(S)

This application is a 35 U.S.C. §371 National Phase Entry Application from PCT/EP2013/057776 filed Apr. 15, 2013, designating the United States, the disclosure of which is incorporated herein in its entirety by reference.

TECHNICAL FIELD

Embodiments herein relate generally to a Policy and Charging Rules Function (PCRF) node and a method in the PCRF node. More particularly the embodiments herein relate to handling User Equipment-Aggregated Maximum Bit Rate (UE-AMBR) associated with a wireless device in a communications network.

BACKGROUND

In a typical communications network a wireless device communicates via a Radio Access Network (RAN) to one or more Core Networks (CNs). The communications network may also be referred to as e.g. a wireless communications network, a wireless communications system, a communications network, a communications system, a network or a system.

The wireless device may be a device by which a subscriber may access services offered by an operator's network and services outside operator's network to which the operator's radio access network and core network provide access, e.g. access to the Internet. The wireless device may be any wireless device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the radio access network, with another entity, such as another wireless device or a server.

Wireless devices are enabled to communicate wirelessly within the communications network. The communication may be performed e.g. between two wireless devices, between a wireless device and a regular telephone and/or between the wireless device and a server via the radio access network and possibly one or more core networks and possibly the Internet.

The communications network covers a geographical area which is divided into cell areas. Each cell area is served by a base station. The base station is also referred to as a Radio Base Station (RBS), evolved Node B (eNB), eNodeB, NodeB, B node or Base Transceiver Station (BTS), depending on the technology and terminology used.

An architecture that supports Policy and Charging Control (PCC) functionality is depicted in FIG. 1. This FIG. 1 has been taken from 3GPP TS 23.203 (V.12.0.0) that specifies the PCC functionality for Evolved 3GPP Packet Switched domain, comprising both 3GPP accesses (GERAN/UTRAN/ E-UTRAN) and Non-3GPP accesses. The PCC functionality is comprised by the functions of the Policy and Charging Enforcement Function (PCEF) node 101, the Bearer Binding and Event Reporting Function (BBERF) 103, the PCRF node 105, the Application Function (AF) 108, the Traffic Detection Function (TDF) 110, the Online Charging System (OCS) 113, the Offline Charging System (OFCS) 115 and the Subscription Profile Repository (SPR) 118 or the User Data Repository (UDR) (not shown).

PCEF 101 is a functional entity which is responsible for enforcement of policies and charging. The PCEF 101 is located at network node, such as e.g. a Packet data network GateWay (PGW) or a Gateway GPRS Support Node (GGSN), and is therefore referred to as a PCEF node in the following. The PCEF 101 is connected to the PCRF node 105 via a Gx interface. The PCEF 101 encompasses service data flow detection (based on the filters definitions comprised in the PCC rules), as well as online and offline charging interactions (not described here) and policy enforcement. Since the PCEF 101 is the entity handling the bearers it is where the QoS is being enforced for the bearer according to the QoS information coming from the PCRF node 105. This PCEF 101 is located at the Gateway (e.g. GGSN in the General Packet Radio Service (GPRS) case, and PGW in the WLAN case). For the cases where there is PMIP instead of GTP protocol between BBERF 103 and PCEF 101, the bearer control is done in the BBERF 103 instead. The PCEF 101 further has a Gz interface towards the OFCS 115 and a Gy interface towards the OCS 113.

The PCRF 105 is a node which takes decisions regarding policy control and has flow based charging control functionality. The PCRF node 105 provides network control regarding the service data flow detection, gating, Quality of Service (QoS) and flow based charging towards the PCEF node 101. The PCRF node 105 receives session and media related information from the AF 108 and informs AF 108 of traffic plane events. The PCRF node 105 may provision PCC Rules to the PCEF node 101 via the Gx reference point. The PCRF node 105 may inform the PCEF node 101 through the use of PCC rules on the treatment of each service data flow that is under PCC control, in accordance with the PCRF node 105 policy decision(s). The PCRF node 105 determines the PCC rules based on for example information from the AF 108 obtained via the Rx interface, information from the PCEF node 101 via the Gx interface, information from the SPR 118 obtained via the Sp interface and information from the BBERF 103 obtained via the Gxx interface etc. The PCRF node 105 further has an Sd interface towards a TDF 110 and a Sy interface towards the OCS 113.

The AF 108 is an element offering applications in which service is delivered in a different layer (i.e. transport layer) from the one the service has been requested (i.e. signaling layer), the control of Internet Protocol (IP) bearer resources according to what has been negotiated. One example of an AF 108 is the Proxy-Call Server Control Function (P-CSCF) of the IP Multimedia Core Network (IM CN) subsystem. The AF 108 may communicate with the PCRF node 105 to transfer dynamic session information (i.e. description of the media to be delivered in the transport layer). This communication is performed using the Rx interface.

UE-AMBR and APN-AMBR

User Equipment-Aggregated Maximum BitRate (UE-AMBR) is a QoS parameter that represents the aggregated maximum bit rate that may be assigned to a wireless device, such as a User Equipment (UE). This means that the maximum bit rate consumed by all the Packet Data Network (PDN) connections established by a wireless device cannot surpass the UE-AMBR assigned to the wireless device. The UE-AMBR is a QoS parameter defined in the wireless device subscription that is stored in a Home Subscriber Server (HSS) or a Home Location Register (HLR). The HSS is for the third Generation Partnership Project (3GPP) and similar to the HLR which is for a Global System for Mobile Communications (GSM) system. In the following, HSS/HLR is used when referring to either the HSS or the HLR.

The Access Point Name-Aggregated Maximum Bitrate (APN-AMBR) is the aggregated maximum bit rate that may be assigned per Access Point Name (APN) for a wireless device. In other words, the sum of the maximum bit rate of all the PDN connections established by a wireless device towards certain APN cannot surpass the value defined in the APN-AMBR. This QoS parameter is statically defined in wireless device subscription stored in the HSS or HLR but may be dynamically changed by the PCRF node 105.

The PDN connection mentioned above is an association between a wireless device and a PDN. The PDN is identified by an APN and a PDN is accessed via a PGW. The wireless device may have multiple PDN connections. The PDN may also be referred to as an external PDN.

The APN mentioned above is a parameter which identifies the PDN that a wireless device wants to communicate with. In addition to identifying a PDN, an APN may also be used to define the type of service that is provided by the PDN, e.g. connection to Wireless Application Protocol (WAP) server, Multimedia Messaging Service (MMS) etc. APN is used in 3GPP data access networks, e.g. GPRS, Evolved Packet Core (EPC).

The Mobility Management Entity (MME) or the Serving General packet radio service Support Node (SGSN) sends the "used UE-AMBR" to a RAN node, e.g. the eNB or Radio Network Controller (RNC) or Base Station Controller (BSC). The used UE-AMBR is the sum of all APN-AMBR for different PDN connections, restricted to the "subscribed UE-AMBR", parameter that MME/SGSN receives from the HSS or the HLR at session establishment. The eNB is used in a Long Term Evolution (LTE) network, RNC is used in a Universal Mobile Telecommunications System (UMTS) network and the BSC is used in a GSM network.

This means:

Used UE-AMBR=Min[Sum(all authorized APN-AMBR),Subscribed UE-AMBR]

The MME is a network node in the EPC. The MME manages session states, authentication, paging, mobility with 3GPP, 2G and 3G nodes, roaming, and other bearer management functions. The SGSN is a network node which is responsible for delivery of data packets from and to the wireless device within its geographical service area. Its tasks comprise packet routing and transfer, mobility management, logical link management, and authentication and charging functions. The location register of the SGSN stores location information and user profiles of all GPRS users registered with this SGSN. The term SGSN refers to an SGSN which at supports the S4 interface or the Gn and Gp interfaces. S4-SGSN refers to an SGSN which supports the S4 interface and does not support Gn and Gp interfaces. Gn/Gp-SGSN refers to an SGSN which supports the Gn and Gp interfaces and does not support S4 interface. The MME and the SGSN may be separate network nodes or they may be co-located in one network node. In the following, MME/SGSN refers to a co-located MME and SGSN, an MME, a S4-SGSN or a Gn/GP-SGSN.

FIG. 2 illustrates the prior art situation for the UE-AMBR versus the APN-AMBR in a communications network based on LTE. The UE-AMBR limits the maximum bit rate on non-Guaranteed Bit Rate (GBR) traffic for a wireless device 120. The globe in FIG. 2 represents a PDN network, e.g. the Internet.

Step 201

The MME/SGSN 125 receives the subscribed UE-AMBR and subscribed APN-AMBR from the HSS/HLR 116. The MME/SGSN 125 and the HSS/HLR 116 are the network nodes which are informed of and may influence the UE-AMBR.

Step 202

The MME/SGSN 125 sends the subscribed APN-AMBR for a PDN-connection to the GW1 node 130a The GW node also forwards the authorized APN-AMBR to the MME/SGSN 125.

Step 203

The GW1 node 130a, in turn, forwards this to the PCRF node 105. The PCRF node 105 may change the APN-AMBR to a value that is different from the subscribed APN-AMBR for a PDN-connection. The APN-AMBR value for a PDN-connection decided by the PCRF node 105 is referred to as authorized APN-AMBR. The PCRF node 105 sends the authorized APN-AMBR to the GW node 105 for enforcement.

Step 204

The MME/SGSN 125 determines and sends the "used UE-AMBR" to the eNB/RNC/BSC 130 which constitutes the sum of the authorized APN-AMBR for all active PDN connections for one wireless device 120, referred to as APN-AMBR in FIG. 2. However this sum is restricted to the "subscribed UE-AMBR" which the MME/SGSN 125 received from the HSS/HLR 116

Note, that the UE-AMBR is enforced in the eNB/RNC/BSC 130 and the APN-AMBR is enforced in the GW 130. Even though the HSS/HLR 116 and the PCRF 105 have all the APN_AMBR values of all the APNs, only one value is downloaded to the MME/SGSN 125 and the GW 130 per session. The RAN node is the enforcing unit, while the MME/SGSN 125 only computes the used UE-AMBR and sends this to the RAN node.

One problem of the prior art is if the PCRF node 105 decides to change (increase) the APN-AMBR value for a specific PDN connection it may potentially have no effect. Since the used UE-AMBR is restricted by the subscribed UE-AMBR this means that an APN-AMBR that is increased beyond this value will have no effect at all on maximal throughput. Of course this is not a problem in cases where the UE-AMBR value specified by the HSS/HLR 116 is very high (which in the extreme case implies that UE-AMBR is disabled in practice).

Another problem is that when, for example, an operator may want to allow simultaneous access to multiple PDNs (e.g. Internet access and virtual private network (VPN)-connectivity) with a fair usage policy that applies across the APNs. Before the usage limit is reached the UE-AMBR should be set to the sum of the APN-AMBR of all active PDN-connection, thus allowing for full speed on all PDN-connections at the same time. The full speed on all PDN-connections will continue for the rest of the time, even though it may not be necessary. This may be described as the operator may want to restrict this full speed upon certain conditions, e.g., when the usage limit established in the user subscription is surpassed. E.g. a user has a subscription that provides 1 Mbps for each of the access sessions (UE-AMBR=numberOfSessions*1 Mbps), up to 1 Gb per month. If the volume consumed surpasses the 1 Gb, then the user will still be able to open sessions but the bitrate of all the simultaneous access sessions will be restricted to 128 Kbps (UE-AMBR=128). When the usage limit is reached the UE-AMBR should be set to a value that is lower than the sum of the APN-AMBR of all active PDN-connections. The PCRF node 105 can retrieve information on data usage, but in the present standard has no influence on the used UE-AMBR decided by the MME/SGSN 125.

SUMMARY

An object of embodiments herein is therefore to obviate at least one of the above disadvantages and to provide enhanced QoS control in the PCRF node.

According to a first aspect, the object is achieved by a method in a PCRF node for handling UE-AMBR for a wireless device in a communications network. The PCRF node comprises a direct interface with a MME/SGSN. The PCRF node receives a subscribed UE-AMBR from the MME/SGSN using the direct interface. The subscribed UE-AMBR is associated with a wireless device subscription. When triggered, the PCRF node calculates a UE-AMBR based on the subscribed UE-AMBR and based policies associated with the wireless device. The PCRF node transmits the calculated UE-AMBR to the MME/SGSN using the direct interface.

According to a second aspect, the object is achieved by a method in a MME/SGSN for handling UE-AMBR of a wireless device in a communications network. The MME/SGSN comprises a direct interface with a PCRF node. The MME/SGSN comprises a subscribed UE-AMBR received from a HSS/HLR. The subscribed UE-AMBR is associated with a wireless device subscription. The MME/SGSN transmits the subscribed UE-AMBR to the PCRF node using the direct interface. The MME/SGSN receives a UE-AMBR from the PCRF node. The MME/SGSN calculates a used UE-AMBR based on the UE-AMBR received from the PCRF node.

According to a third aspect, the object is achieved by a PCRF node for handling UE-AMBR associated with a wireless device in a communications network. The PCRF node is adapted to comprise a direct interface with a MME/SGSN. The PCRF node comprises a receiver which is adapted to receive a subscribed UE-AMBR from the MME/SGSN using the direct interface. The subscribed UE-AMBR is associated with a wireless device subscription. The PCRF comprises a calculating unit which is adapted to calculate, when triggered, a UE-AMBR based on the subscribed UE-AMBR and based policies associated with the wireless device. The PCRF comprises a transmitter which is adapted to transmit the calculated UE-AMBR to the MME/SGSN using the direct interface.

According to a fourth aspect, the object is achieved by a MME/SGSN for handling UE-AMBR associated with a wireless device in a communications network. The MME/SGSN is adapted to have a direct interface with a PCRF node. The MME/SGSN comprises a subscribed UE-AMBR received from a HSS/HLR. The subscribed UE-AMBR is associated with a wireless device subscription. The MME/SGSN comprises a transmitter which is adapted to transmit the subscribed UE-AMBR to the PCRF node using the direct interface. The MME/SGSN comprises a receiver which is adapted to receive a UE-AMBR from the PCRF node. The MME/SGSN comprises a calculating unit which is adapted to calculate a used UE-AMBR based on the UE-AMBR received from the PCRF node.

Since the MME/SGSN and the PCRF node is able to negotiate the UE-AMBR using the direct interface between the MME/SGSN and the PCRF node, enhanced QoS control in the PCRF node is provided.

Embodiments herein afford many advantages, of which a non-exhaustive list of examples follows:

One advantage of the embodiments herein is that the provisioning of the subscribed UE-AMBR over a direct interface between the SGSN/MME and the PCRF node may enable the PCRF node to make safe decisions of what APN-AMBR values to set for different PDN-connections, i.e. the PCRF node would not risk authorizing APN-AMBR values that alone or aggregated supersede the upper limit of the subscribed UE-AMBR.

Another advantage of the embodiments herein is that the possibility to change the authorized UE-AMBR may provide better flexibility compared to the standardized functionality as it enables the PCRF node to either promote (upgrade) or limit (downgrade) this value for a user at any time based on dynamic policies. This would for example enable an operator to define fair usage policies that affect the maximum possible bitrate that is shared by PDN-connections to different APNs.

A further advantage is that the embodiments herein may provide a mechanism to dynamically change the UE-AMBR value based on policies, limiting or incrementing the bandwidth per wireless device.

Furthermore, an advantage of the embodiments herein is that they may provide a mechanism to communicate the UE-AMBR to the MME/SGSN that does not rely on proprietary extensions to multiple interfaces nor does it require standardization (in the short term at least).

Also, another advantage is that since the embodiments herein are based on direct communication between the SGSN/MME and the PCRF node, the SGSN/MME would always be aware of if the same or several PCRF nodes are used for multiple PDN-connections to different APNs. The SGSN/MME may therefore be able to detect if different UE-AMBR decisions comes from different PCRF nodes. This is a major advantage compared to setting UE-AMBR from PCRF node using existing EPC interfaces such as GPRS Tunneling Protocol (GTP) and Gx, in which case the MME/SGSN is not aware of the PCRF node.

A further advantage of the embodiments herein may be that it is possible for the PCRF node, from a policy perspective, to limit the maximum bandwidth of all non-GBR traffic for different PDN-connections that are targeting different APNs of a wireless device.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
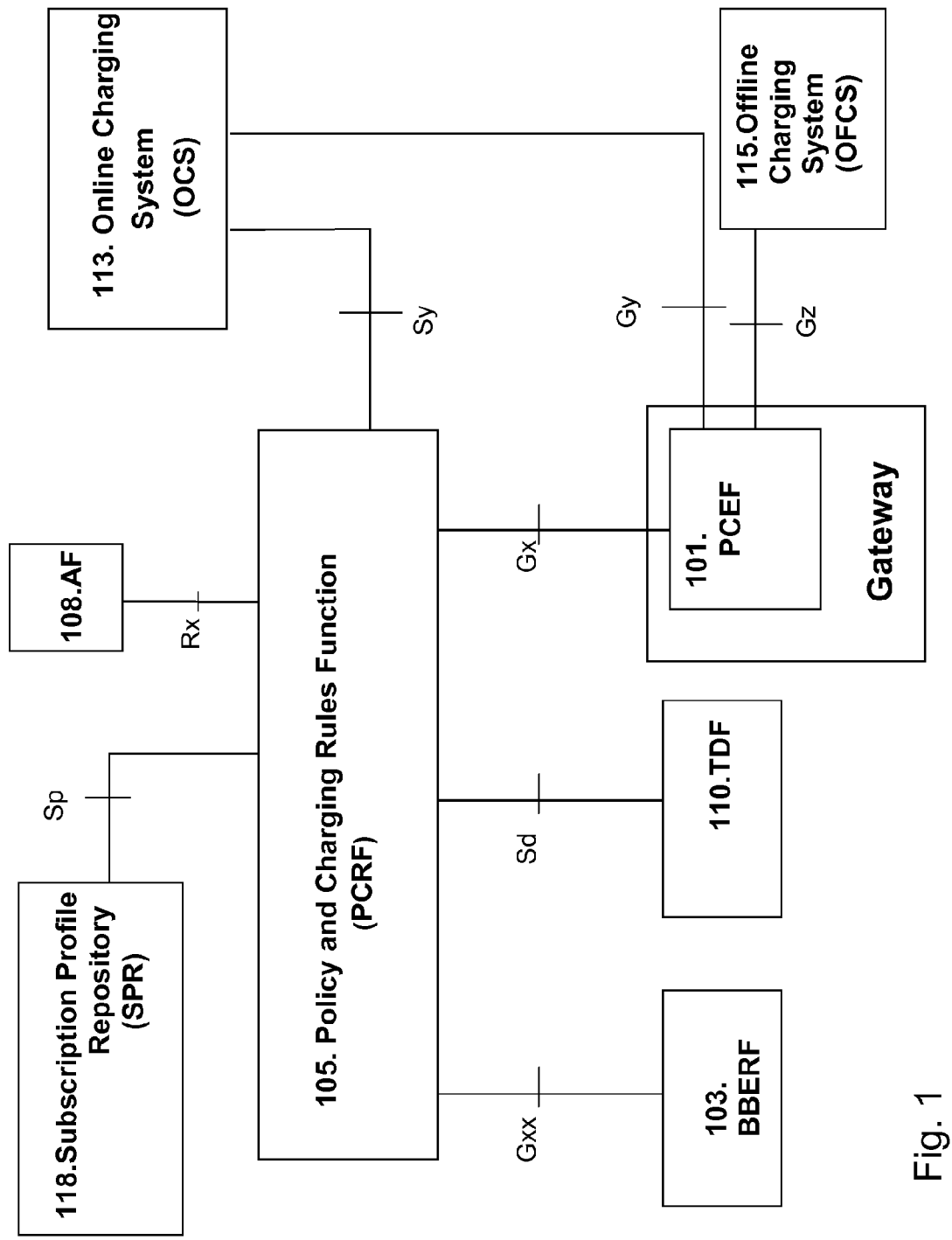
FIG. 1 is a schematic block diagram illustrating a Policy and Charging Control (PCC) Architecture in 3rd Generation Partnership Project (3GPP).
Figure 2:
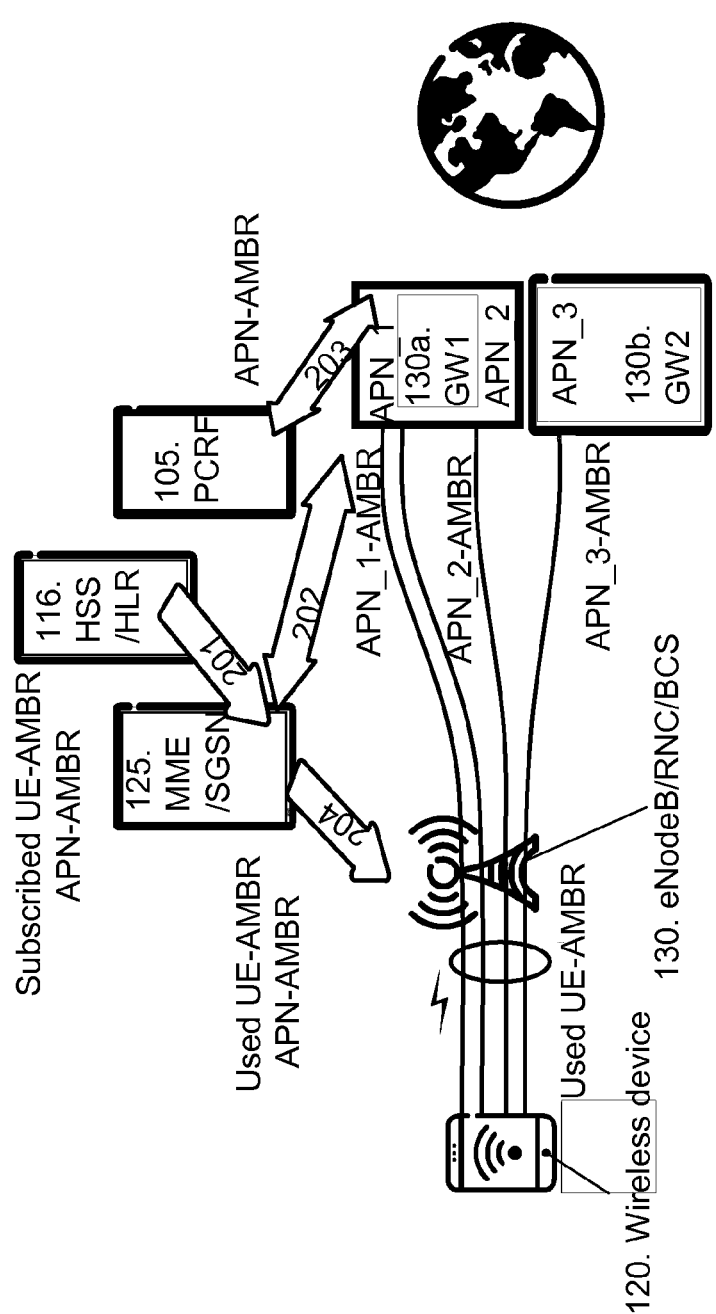
FIG. 2 is a schematic block diagram illustrating UE-AMBR vs. APN-AMBR.
Figure 3:
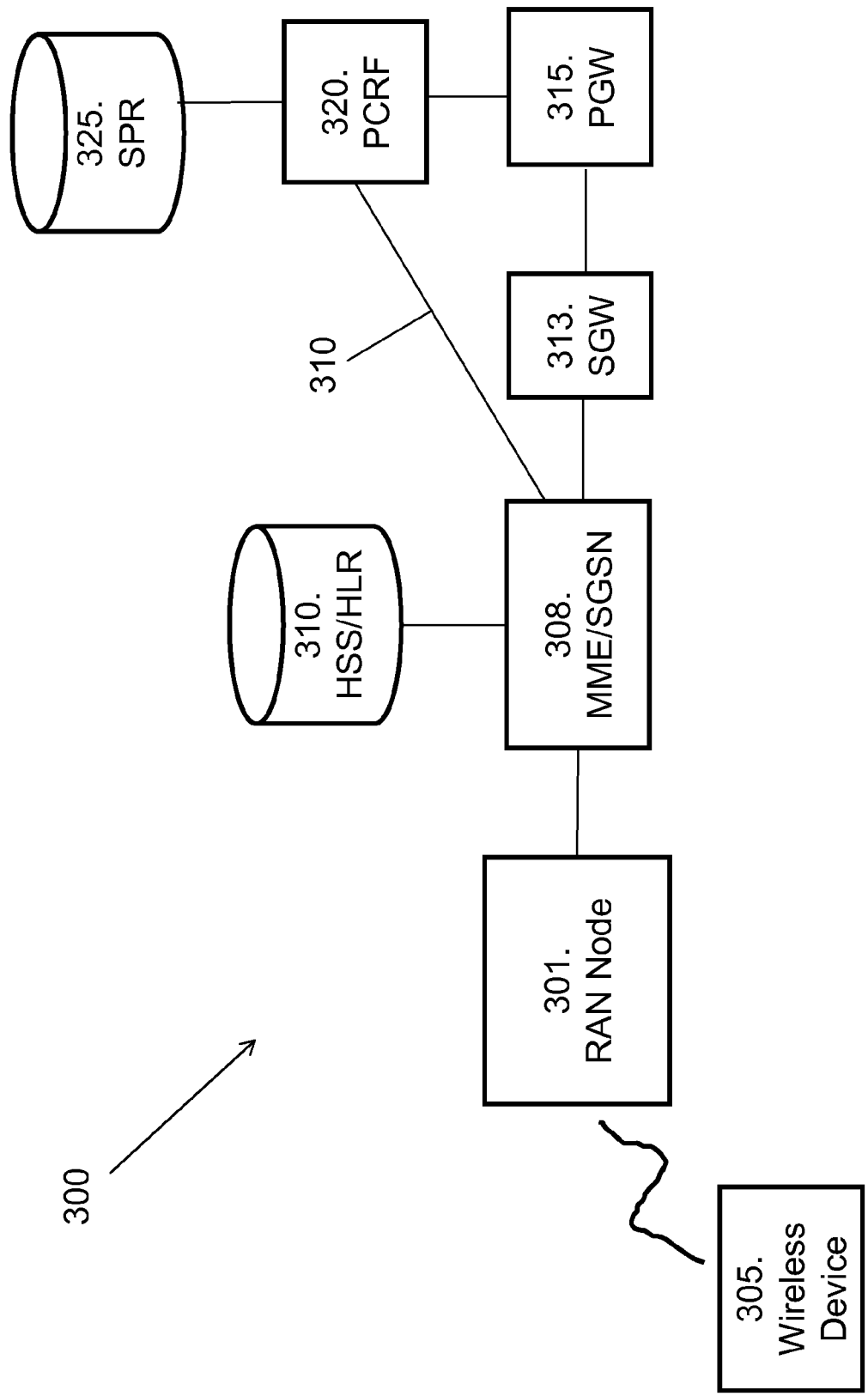
FIG. 3 is a schematic block diagram illustrating embodiments of a communications network.

FIG. 3 depicts a communications network 300 in which embodiments herein may be implemented. The communications network 300 may in some embodiments apply to one or more radio access technologies such as for example Long Term Evolution (LTE), LTE Advanced, Wideband Code Division Multiple Access (WCDMA), Global System for Mobile Communications (GSM), or any other 3GPP radio access technology, or other radio access technologies such as e.g. Wireless Local Area Network (WLAN).

The wireless communications network 300 comprises a RAN node 301 such as an eNB, RNC, BSC or any other network unit capable to communicate over a radio carrier with a wireless device 305. The RAN node 301 may be an eNodeB in case of an LTE network, and a RNC in case of a WCDMA network and a BSC in case of a GERAN network.

The wireless device 305 may be a device by which a subscriber may access services offered by an operator's network and services outside operator's network to which the operator's radio access network and core network provide access, e.g. access to the Internet. The wireless device 305 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device or any type of consumer electronic, for instance but not limited to television, radio, lighting arrangements, tablet computer, laptop or Personal Computer (PC). The wireless device 305 may be portable, pocket storable, hand held, computer comprised, or vehicle mounted devices, enabled to communicate voice and/or data, via the radio access network, with another entity, such as another wireless device or a server.

The RAN node 301 is connected to a MME/SGSN 308. The MME/SGSN 308 may be a MME, a S4-SGSN, a Gn/Gp-SGSN or a co-located MME/SGSN node. The MME/SGSN 308 is connected to a HSS/HLR 310. The HSS/HLR 310 may be a HSS when the MME/SGSN 308 is a MME or a S4-SGSn. The HSS/HLR 310 may be a HLR when the MME/SGSN 308 is a Gn-SGSN. The MME/SGSN 308 is further connected to a Serving GateWay (SGW) 313 and the SGW 313 is connected to a PGW 315. The SGW 313 is the gateway which terminates the user plane interface towards the radio access network. The wireless device 305 is associated with one SGW 313. The SGW 313 is responsible for data transfer in terms of all packets across the user plane. The PGW 315 is the gateway which terminates the interface towards PDN. If the wireless device 305 is accessing multiple PDNs, there may be more than one PGW 315 for that wireless device 305. The PGW 315 handles mobility between 3GPP and non-3GPP technologies and provides connectivity from the wireless device 305 to the external PDN.

The MME/SGSN 308 has a direct interface 317 towards the PCRF node 320. The PGW 315 is also connected to the PCRF node 320. The PCRF node 320 is connected to a Subscriber Profile Repository (SPR) 325. SPR 325 is a database comprising subscriber and subscription related information which is needed by the PCRF node 320 to perform service- and subscription-based policies.

In the prior art, the UE-AMBR is the only QoS related parameter that the PCRF node 320 is neither informed of or has the possibility to influence. The embodiments herein defines a negotiation between the MME/SGSN 308 and the PCRF node 320 for the aggregated maximum bit rate assigned for a wireless device 305 (UE-AMBR) using the direct interface 317 between the MME/SGSN 308 and the PCRF node 320. The method for handling UE-AMBR associated with the wireless device 305 in the communications network 300 according to some embodiments will now be described with reference to the signaling diagram depicted in FIG. 4. The method comprises the following steps, which steps may as well be carried out in another suitable order than described below:

Step 401

The MME/SGSN 308 receives a subscribed UE-AMBR from the HSS/HLR 310. The subscribed UE-AMBR is a value or parameter stored in the HSS/HLR 310. The subscribed UE-AMBR is associated with the wireless device subscription.

The UE-AMBR is per wireless device 305, e.g. user equipment, where a wireless device 305 has a Subscriber Identity Module (SIM) card with an International Mobile Subscriber Identity (IMSI). The SIM card may be moved from one wireless device to another. I.e. the wireless device 305 changes (different International Mobile Equipment Identity (IMEI)) but the IMSI (the subscription) is the same, so, the UE-AMBR is associated with the subscriber subscription.

Step 402

The MME/SGSN 308 initiates a communication towards the PCRF node 320 with the purpose to negotiate the UE-AMBR. The initiating of the communication is done upon an Internet Protocol-Connectivity Access Network (IP-CAN)/PDN connection establishment.

Step 403

The MME/SGSN 308 transmits the subscribed UE-AMBR value to the PCRF node 320 using the direct interface 317.

Step 404

When triggered, the PCRF node 320 calculates a UE-AMBR based on the subscribed UE-AMBR and based on policies associated with the wireless device 305.

The policies may comprises one or several conditions that may refer to subscription related information or dynamic information or a combination of both. The conditions may depend on for example:

Subscriber category.
Time of day.
Other information received from MME (e.g. location).
Total amount of usage consumed during previous sessions or concurrent current sessions.
Number of concurrent sessions.
Network information, e.g. roaming condition.
Others.

The PCRF node 320 may also base the calculation on for example APN-AMBR values assigned in the user active PDN connections to calculate the UE-AMBR, and also in the other way around, in order to assign the correct APN-AMBR value to a PND connection, the PCRF node 320 may considered the subscribed UE-AMBR received from the MME/SGSN 308. The APN-AMBR is based on subscriber policies and subscribed APN-AMBR (received from PCEF/GW over Gx).

Each time a user initiates an IP-CAN session, the PGW 315 initiates a Gx session towards the PCRF 320. The PCRF 320 receives a proposed APN-AMBR, and after an evaluation the PCRF 320 confirms the value received or downloads a new APN-AMBR value. This means that the PCRF 320 has the knowledge of all the APN-AMBR assigned for each session. If all the user sessions come to the same PCRF 320, then there is not any problem since this PCRF 320 is the one that has decided the APN-AMBR value for each of the user sessions. Consequently, this PCRF 320 is aware of all the APN-AMBR values assigned for the active user connections. However, if the user sessions come to different PCRFs 320, then the only way for a PCRF to be aware of all the APN-AMBR assigned for this user is to store this information in a central SPR shared by the different PCRFs. Each PCRF 320 is responsible to store the APN-AMBR value calculated for a user session in the central SPR. So, any PCRF 320, upon session establishment, could access to the SPR, and retrieve for this user, all the APN-AMBRs assigned for all the active sessions of this user.

The total amount of usage consumed mentioned in the list above is the amount of volume (bytes) or total time consumed or in terms of money. The consumer is the user. Normally the user has a subscription with a limit of usage. E.g. 1 Gb per month, and if surpassed the user still has access but the QoS is downgraded.

The PCRF node 320 may calculate a UE-AMBR which is different from the subscribed UE-AMBR or a UE-AMBR which is equal to the subscribed UE-AMBR. If the calculated UE-AMBR is equal to the subscribed UE-AMBR, the subscribed UE-AMBR is just confirmed.

The trigger is a trigger which has an impact on the UE-AMBR. The trigger may be receipt of a request for the UE-AMBR, it may be an internal event or it may be receipt of a message from a network node. For example, in the standard there is an interface between OCS and PCRF node 320 called Sy. This interface is used for the OCS to communicate information about usage counters to the PCRF node 320. The message from the network node described above may a message received from the OCS and indicating consumption information, e.g. when a certain monetary limit is surpassed. The network node is in this case the OCS. The total usage consumed may be controlled by the OCS, and the OCS may inform the PCRF node 320 via the Sy interface. The PCRF node 320 may start calculating the UE-AMBR upon receipt of such message. Another way to receive usage information in the PCRF node 320 is via Gx from the PGW/GGSN.

The UE-AMBR determined by the PCRF node 320 may also be referred to as PCRF determined UE-AMBR or policy based UE-AMBR.

Step 405

The PCRF node 320 transmits the calculated UE-AMBR to the MME/SGSN 308 using the direct interface 317.

Step 406

The MME/SGSN 308 overrides the subscribed UE-AMBR by the UE-AMBR received from the PCRF node 320. If the UE-AMBR is equal to the subscribed UE-AMBR, there will be no different in the value when overriding. If the UE-AMBR is different than the subscribed UE-AMBR, there will be a difference in the value when overriding. The original subscribed value still needs to be stored by the MME/SGSN 308. The reason is that in case the HSS/HLR 310 provides a subscription update, then the MME/SGSN 308 needs to have the original value to compare with in order to see if this has changed.

In the standard, when multiple PDN-connections to different APNs are established, it is possible that those PDN-connections might end up at different PGWs 315 and also on different PCRF nodes 320. With multiple PCRF nodes 320 in control of different PDN-connections of a single wireless device 305 it gets problematic to set the UE-AMBR since this is a wireless device level parameter and different PCRF nodes 320 may thus send contradicting values to the MME/SGSN 308. In the standard solution, the MME/SGSN 308 is not aware of the PCRF node 320, i.e. it cannot deduce if one or several PCRF nodes 320 are selected for different PDN-connections. However, since the direct interface 317 between the MME/SGSN 308 and the PCRF node 320 is used in the embodiments herein, the MME/SGSN 308 would always be aware of the selected PCRF node 320 for any given PDN-connection in the case of multiple PCRF nodes. Thus, the problem with multiple PCRF nodes setting different UE-AMBRs without the MME/SGSN 308 knowing from which PCRF node 320 the decision comes from is eliminated.

When more than one PCRF node 320 is deployed in the network 300, the solution proposed in the 3GPP TS 29.213 V.11.6.9 for PCRF node selection, is based on the use of a Diameter Routing Agent (DRA). The DRA is a Diameter Agent (proxy or redirect) that ensures that all Diameter sessions established over the Gx, S9, Gxx, Rx and Sd reference points, for a certain IP-CAN session or User Equipment-Network Access Identifier (UE-NAI) reach the same PCRF node 320 when multiple and separately addressable PCRF nodes 320 have been deployed in a Diameter realm. The session establishment between MME/SGSN 308 and PCRF node 320 may take place prior to Gx session establishment what implies that the IP-address of the PDN-connection is not known when the MME/SGSN-PCRF node session is established. This implies that for this case, if a DRA is used, the DRA will have to use the UE-NAI (International Mobile Subscriber Identity (IMSI)) and APN to select the PCRF node 320. The DRA is optional since it is not required in a network that deploys a single PCRF node 320 per Diameter realm.

The method for handling UE-AMBR associated with the wireless device 305 in the communications network 300 in a scenario with an Attach/Primary Packet data protocol (PDP)-context activation, according to some embodiments will now be described with reference to the signaling diagram depicted in FIG. 5. The method comprises the following steps, which steps may as well be carried out in another suitable order than described below:

Step 501

Figure 4:
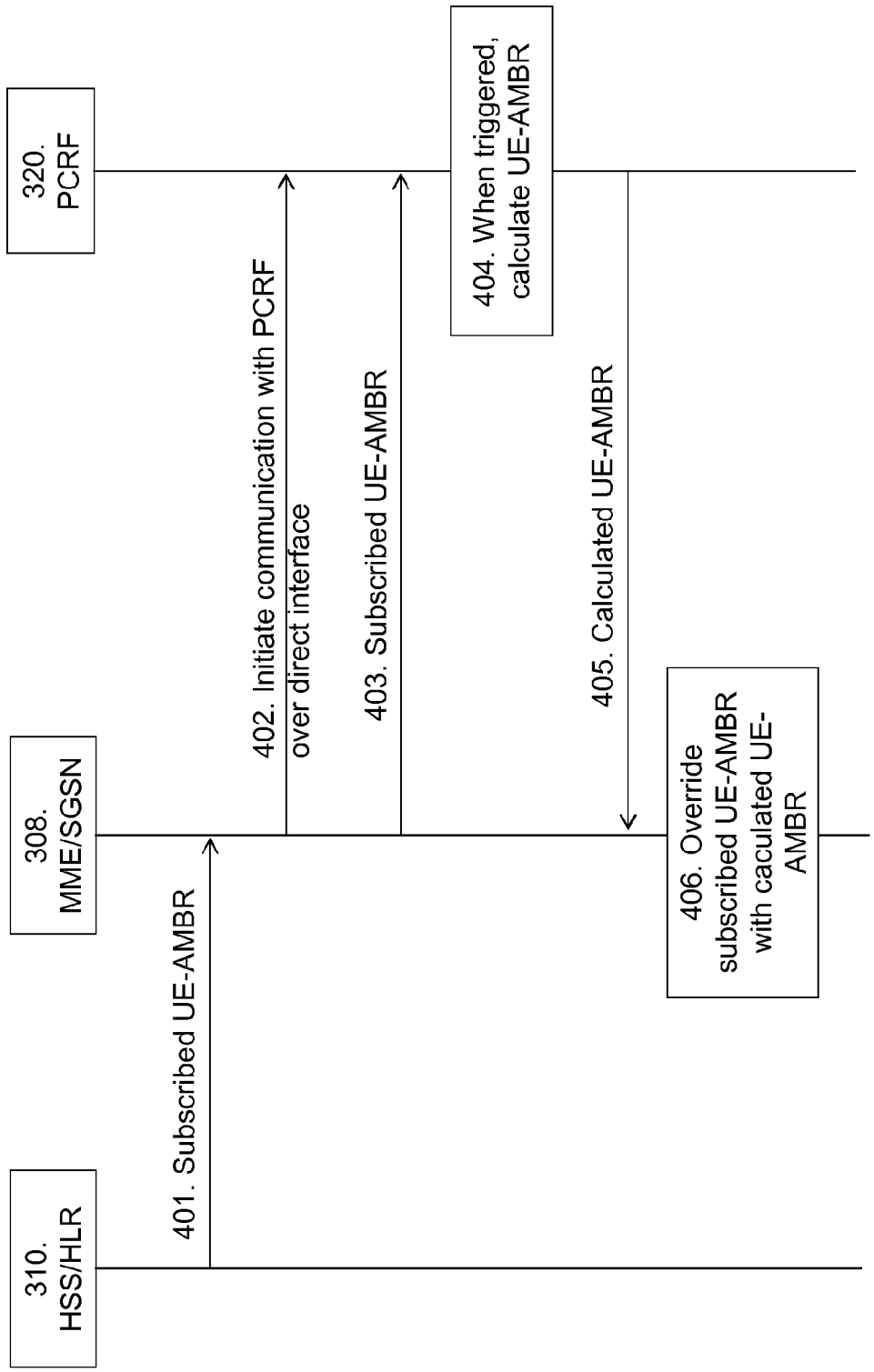
FIG. 4 is a signaling diagram illustrating embodiments of a method in a communications network.

This step corresponds to step 401 in FIG. 4. An Attach Procedure or a UE Requested PDN-Connectivity procedure or a PDP-Context activation procedure is performed. During this initial procedure the MME/SGSN 308 obtains the subscribed UE-AMBR from the HSS/HLR 310.

Figure 5:
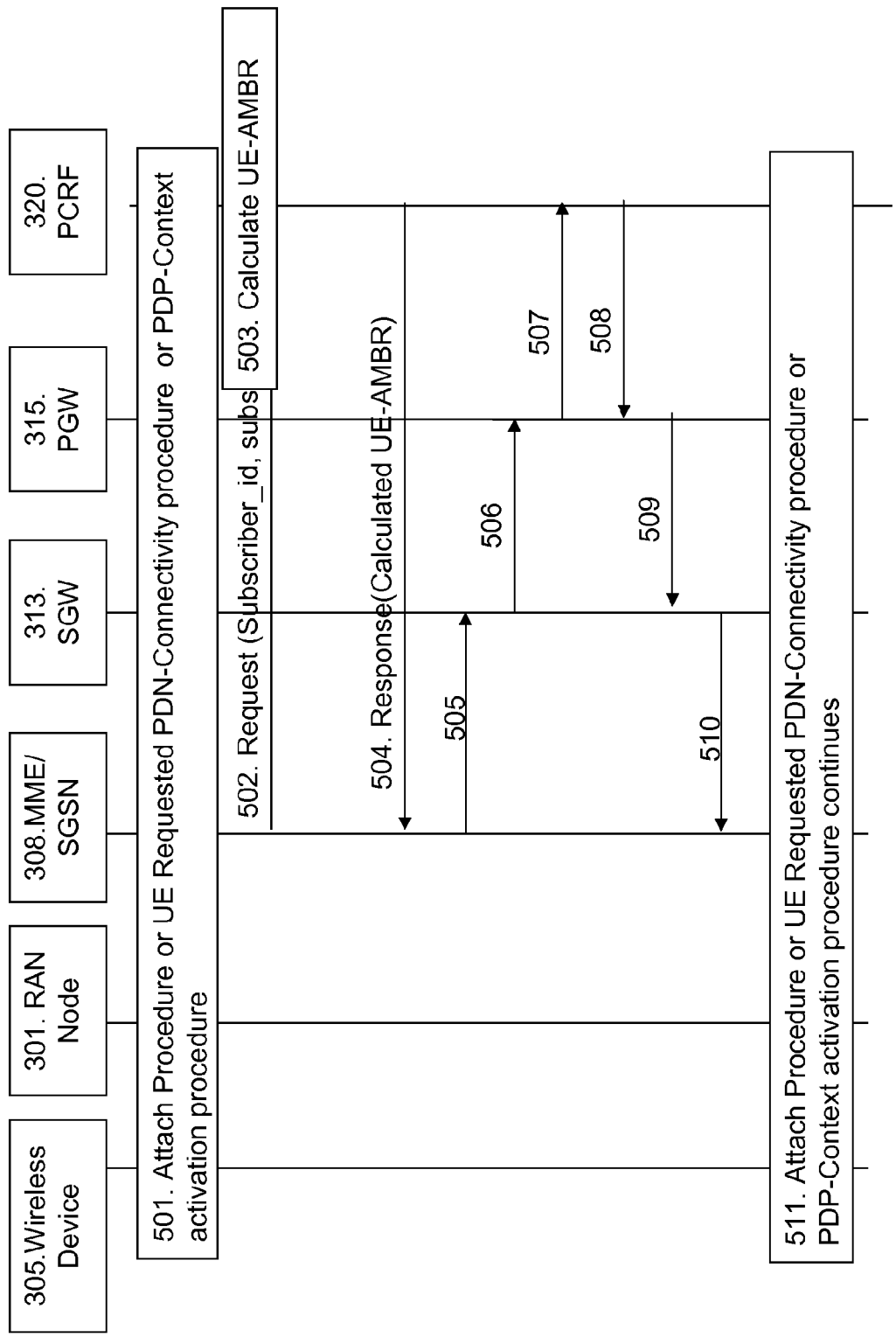
FIG. 5 is a signaling diagram illustrating embodiments of a method in a communications network for an attach/primary PDP-context activation.

The attach procedure may be the Attach Procedure as described in section 5.3.2 of TS 23.401 V.12.0.0, i.e. the steps before step 12 in FIG. 5.3.2.1-1. The UE Requested PDN-Connectivity procedure may be the one as described in section 5.10.2 in TS 23.401, V.12.0.0, before step 2 in FIG. 5.10.2-1. The PDP-Context activation procedure may be the one described in section 5.9.2 in TS 23.060, V. 12.0.0, before step 4 in FIGS. 63 and 64.

An attach procedure may be an E-UTRAN Initial attach procedure and is the process between the wireless device 305 being switched on and before sending signaling or data specific for the wireless device 305. The attach procedure may also be described as the procedure related to that the wireless device 305 wants its first PDN connection. A UE requested PDN-Connectivity procedure is a procedure used when the wireless device 305 wants to setup a second or more PDN connection. A PDP-Context activation procedure is a procedure used to create a PDP context, and may be initiated by the wireless device 305 or the network.

Step 502

This step corresponds to step 403 in FIG. 4. The subscribed UE-AMBR is forwarded by the MME/SGSN 308 to the PCRF node 320 over the direct interface 317 in a request message. The request message may be a combined request to set up the interface connection and to request the UE-AMBR. The MME/SGSN 308 also sends a subscriber ID together with the subscribed UE-AMBR. Without the subscriber ID, the PCRF 320 cannot calculate the correct UE-AMBR according to the subscriber profile.

Step 503

This step corresponds to step 404 in FIG. 4. The PCRF node 320 calculates the UE-AMBR to be used. The decision is taken based on the subscribed UE-AMBR, policies and considering subscription information retrieved from the SPR 325.

Step 504

This step corresponds to step 405 in FIG. 4. The PCRF node 320 transmits the calculated UE-AMBR to the MME/SGSN 308.

Step 505

The MME/SGSN 308 sends a Create Session Request to the SGW 313 as per normal procedures already specified in the standard.

Step 506

The SGW 313 sends a Create Session Request to the PGW 315 as per normal procedures already specified in the standard.

Step 507

The PGW 315 initiates a new Gx session towards the PCRF node 320 as per normal procedures already specified in the standard.

Step 508

The PCRF node 320 responds to the Gx session request to the PGW 315 as per normal procedures. Based on the decided UE-AMBR, the PCRF node 320 may adjust the APN-AMBR downloaded in the Gx response to the PGW 315.

Step 509

The PGW 315 sends a Create Session Response to the SGW 313 as per normal procedures already specified in the standard.

Step 510

The SGW 313 sends a Create Session Response to the MME/SGSN 308 as per normal procedures already specified in the standard.

Step 511

This step corresponds to step 406 in FIG. 4. The attach procedure or the UE Requested PDN-Connectivity procedure or the PDP-Context activation procedure continues. The UE-AMBR provided to the MME/SGSN 308 from the PCRF node 320 is applied and used internally in the MME/SGSN 308 and in successive procedures of relevance.

Note that FIG. 5 does not show the use of a DRA, that as mentioned before, it is necessary when more than one PCRF node 320 is deployed. In that case a DRA is used between MME/SGSN 308 and PCRF node 320, and between PGW 315 and PCRF node 320 for the policy server selection.

Figure 6:
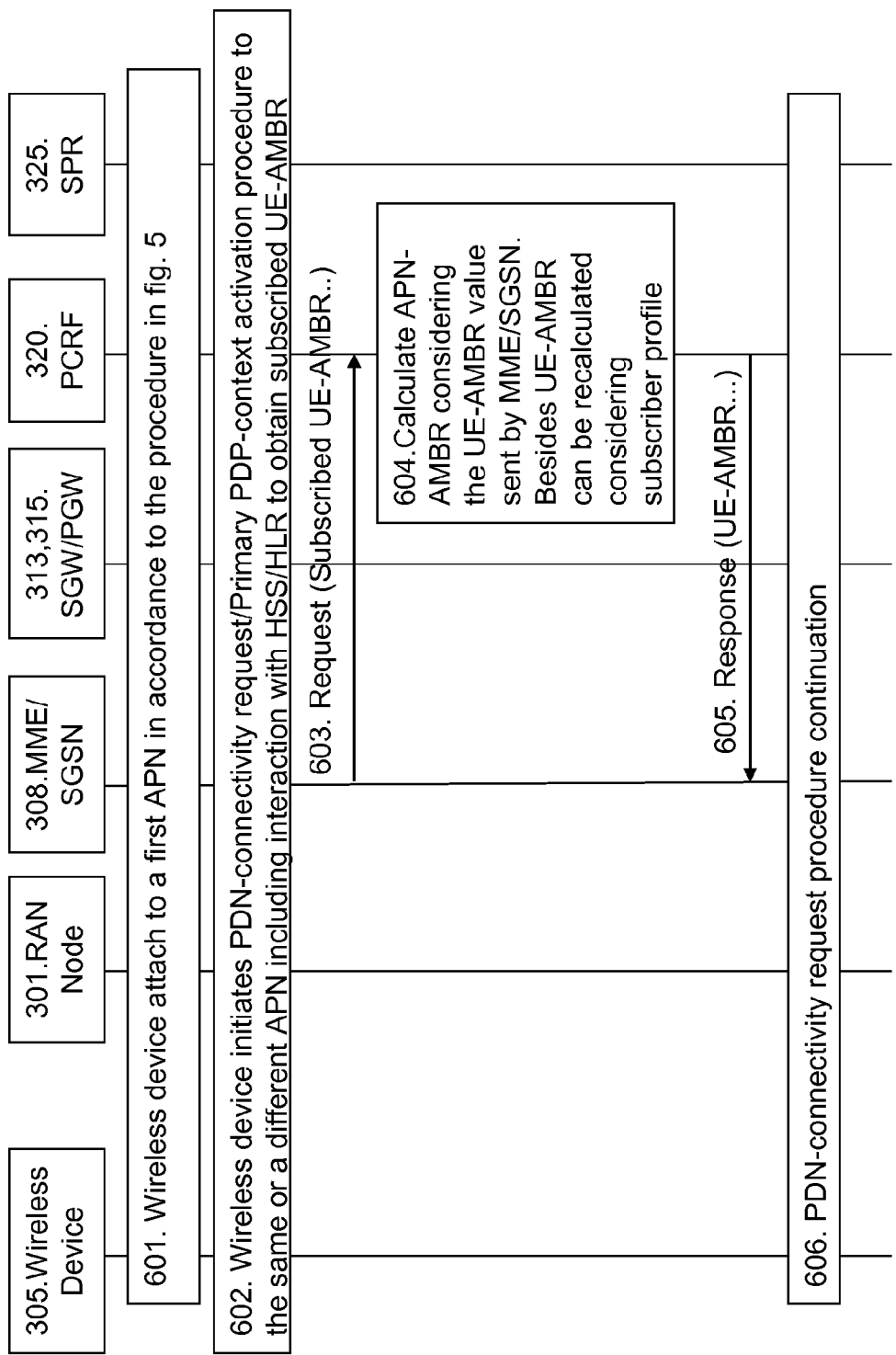
FIG. 6 is a signaling diagram illustrating embodiments of a method in a communications network for concurrent sessions of the same wireless device.

The method for handling UE-AMBR associated with the wireless device 305 in the communications network 300 in a scenario with concurrent sessions of the same wireless device 305, according to some embodiments will now be described with reference to the signaling diagram depicted in FIG. 6. The method comprises the following steps, which steps may as well be carried out in another suitable order than described below:

Step 601

The wireless device 305 attaches to the network, i.e. attaches to a first APN, or initiates a primary PDP-context activation according to the procedure described above in relation to FIG. 5. The UE-AMBR is set by the PCRF node 320. The PCRF 320, as said in previous paragraphs, will determine the UE-AMBR based on the UE-AMBR value received from the MME/SGSN 308 and based on policies that will consider several factors/information as mentioned above.

Step 602

This step corresponds to steps 401 and 402 in FIG. 4. The wireless device 305 initiates a second concurrent PDN-connection/primary PDP-context activation procedure to a different APN. An APN may be described as an IP router that provides the connection between the wireless device 305 and the Packet Data Network. The step also comprises that the MME/SGSN 308 interacts with the HSS/HLR 310 to obtain a subscribed UE-AMBR.

Step 603

This step corresponds to step 403 in FIG. 4. The subscribed UE-AMBR is forwarded by the MME/SGSN 308 to the PCRF node 320 over the direct interface 317. The subscribed UE-AMBR is sent in a request message. Note that if this PDN-connection is destined to a different PCRF node 320 than for the first PDN-connection the MME/SGSN 308 would be aware of this.

Step 604

This step corresponds to step 404 in FIG. 4. The PCRF node 320 calculates the UE-AMBR. The decision is taken based on the subscribed UE-AMBR, policies and considering subscription information retrieved from the SPR 325, and now also the other ongoing PDN-connection. In this case, the PCRF node 320 considers the UE-AMBR calculated for the first IP CAN session established by this wireless device 305. The PCRF node 320 may decide to maintain the same value or to change it, for example increasing it. As a result the PCRF node 320 may provide updated policies e.g. for the APN-AMBR of this or the parallel PDN-connection.

Step 605

This step corresponds to step 405 in FIG. 4. The PCRF node 320 returns the calculated UE-AMBR to the MME/SGSN 308 in a response message, i.e. a response to the request in step 603. In case a different PCRF node 320 than for the first PDN-connection is used then the MME/SGSN 308 would be aware of this and e.g. local configuration in the MME/SGSN 308 could be used to decide if the PCRF node 320 is allowed to change the UE AMBR.

Step 606

The UE Requested PDN-Connectivity procedure or the PDP-Context activation procedure continues as per normal procedures.

The method for handling UE-AMBR associated with the wireless device 305 in the communications network 300 in a scenario with reauthorization, change of UE-AMBR upon subscriber profile change, according to some embodiments will now be described with reference to the signaling diagram depicted in FIG. 7. The method comprises the following steps, which steps may as well be carried out in another suitable order than described below:

Step 701

The procedure is precluded by an initial attach, primary PDP-context activation according to the procedure described in relation to FIG. 5. The UE-AMBR is also set by the PCRF node 320.

Step 702

An event takes place. The event may be that an external message is received at the PCRF node 320, e.g. a subscriber profile change is notified to the PCRF node 320 from the SPR 325 or a notification from the OCS (not shown) over Sy is received, or a Gx/Sd update request is received. The event could also be PCRF node internal. The event has an impact on the UE-AMBR policy. This may for example be that a user of the wireless device 305 has bought a temporary subscription upgrade (UE-AMBR turbo button), that the user is now returning to the Home Public Land Mobile Network (HPLMN) from a Visited Public Land Mobile Network (VPLMN), that the user has reached a volume limit for fair usage policies that affect the maximum possible bitrate that is shared by PDN-connections to different APNs.

Step 703

This step corresponds to step 404 in FIG. 4. Triggered by the event in step 702, the PCRF node 320 calculates the UE-AMBR and APN-AMBR and other policies considering subscriber profile changes, e.g. the subscribed UE-AMBR.

Step 704

This step corresponds to step 405 in FIG. 4. The PCRF node 320 sends the calculated UE-AMBR to the MME/SGSN 308 in a reauthorization message.

Step 705

The SGSN/MME 308 re-calculates the used UE-AMBR based on the new vale received from the PCRF node 320 and updates the eNB/RNC/BSC (depending on access) if the value has changed compared to the previously provided used UE-AMBR.

Step 706

The MME/SGSN 308 sends an acknowledgement to the PCRF node 320 which acknowledges the receipt of the calculated UE-AMBR in step 704.

Step 707

If e.g. the APN-AMBR value is affected by the change in UE-AMBR (i.e. policies for APN-AMBR and UE-AMBR is coupled), the PCRF node 320 will reauthorize also the Gx session(s) with new APN-AMBR values transmitted to the PGW 315.

Step 708

The PGW 315 transmits an acknowledgement of the received APN-AMBR to the PCRF node 320.

Steps 707 and 708 are illustrated with dotted arrows to show that they are conditional. Steps 707 and 708 are only executed in case e.g. APN-AMBR and UE-AMBR policies are coupled and the change of UE-AMBR had an impact on the APN-AMBR policy.

Figure 8:
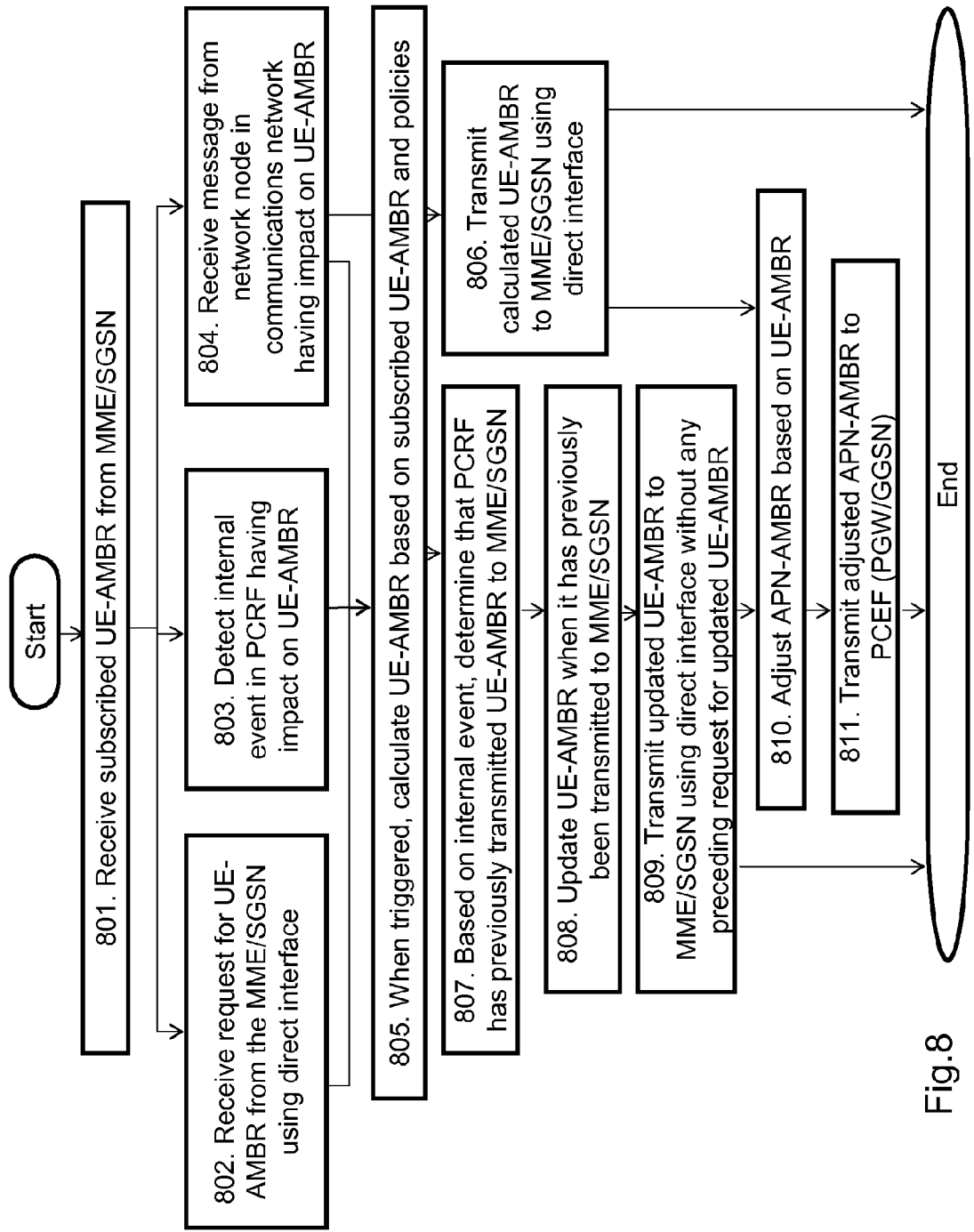
FIG. 8 is a flowchart illustrating embodiments of a method in a PCRF node.

The method described above will now be described seen from the perspective of the PCRF node 320. FIG. 8 is a flowchart describing the present method in the PCRF node 320 for handling UE-AMBR for the wireless device 320 in the communications network 300. The PCRF node 320 comprises a direct interface 317 with the MME/SGSN 308. In some embodiments the PCRF node 320 comprises an APN-AMBR assigned per APN for the wireless device 305. The APN-AMBR may be assigned in an active PDN connection for a wireless device 305. The method comprises the further steps to be performed by the PCRF node 320, which steps may be performed in any suitable order than described below:

Step 801

The PCRF node 320 receives the subscribed UE-AMBR associated with a wireless device subscription from the MME/SGSN 308.

Step 802

Step 802 is an alternative to step 803 and 804. In some embodiments, the trigger comprises that the PCRF node 320 receives a request for the UE-AMBR from the MME/SGSN 308 using the direct interface 317. The request may comprise the subscribed UE-AMBR associated with the wireless device 305, so in this case steps 801 and 802 are combined.

Step 803

Step 803 in an alternative to step 802 and step 804. In some embodiments, the trigger comprises that the PCRF node 320 detects an internal event in the PCRF node 320. The internal event has an impact on the UE-AMBR.

Step 804

Step 804 is an alternative to step 802 and 803. In some embodiments, the trigger comprises that the PCRF node 320 receives a message from a network node in the communications network 300. The message comprises information which has an impact on the UE-AMBR.

Step 804

The PCRF node 320 receives a subscribed UE-AMBR from the MME/SGSN 308 using the direct interface 317.

The subscriber UE-AMBR is received in the MME/SGSN 308 prior to the initiation of the direct interface 317, and it is received in the PCRF node 320 after the communication between the MME/SGSN 308 and the PCRF node 308 is initiated.

Step 805

When triggered, the PCRF node 320 calculates a UE-AMBR based on the subscribed UE-AMBR and based on policies associated with the wireless device 305.

The policies may comprises one or several conditions that may refer to subscription related information or dynamic information or a combination of both. The conditions may depend on for example:

Subscriber category.
Time of day.
Other information received from MME (e.g. location).
Total amount of usage consumed during previous sessions or concurrent current sessions.
Number of concurrent sessions.
Network information, e.g. roaming condition.
Others.

The UE-AMBR may be further calculated based on the APN-AMBR. The UE-AMBR may be calculated further based on at least one of policies and subscription information received from the SPR 325 and total usage consumed. The UE-AMBR may be calculated further based on at least one of information indicating an active PDN connection associated with the wireless device 305 and a previous UE-AMBR calculated for a previous PDN connection associated with the wireless device 305. In addition to the subscribed UE-AMBR, the calculation may be done based on subscriber profile and other elated session parameters such as e.g. APN-AMBR mentioned above.

The subscribed UE-AMBR may also be referred to as an original subscribed UE-AMBR in order to clarify that it is the original value received from the HSS/HLR 310.

In some embodiments, the value of the UE-AMBR is calculated so that it should support a high APN-AMBR. The PCRF node 320 may also adjust the value of the UE-AMBR based on other factors such as e.g. time of day policies, promotion levels etc.

Since the PCRF has knowledge about the subscribed UE-AMBR a decision to change (increase) the APN-AMBR value for a specific PDN connection has an effect.

The calculated UE-AMBR may be different from the subscribed UE-AMBR or equal to the subscribed UE-AMBR.

Step 806

The PCRF node 320 transmits the calculated UE-AMBR to the MME/SGSN 308 using the direct interface 317.

Step 807

In some embodiments, based on the internal event in step 802, the PCRF node 320 determines that the PCRF node 320 has previously transmitted a UE-AMBR to the MME/SGSN 308.

Step 808

This step is performed after step 807. In some embodiments, the PCRF node 320 updates the UE-AMBR when it has previously been transmitted to the MME/SGSN 308. The previous transmission of the UE-AMBR may be seen as an internal event.

Step 809

This step is performed after step 808. In some embodiments, the PCRF node 320 transmits the updated UE-AMBR to the MME/SGSN 308 without having received any preceding request for the updated UE-AMBR from the MME/SGSN 308. In this case the MME/SGSN 308 receives the updated UE-AMBR and re-evaluates the used UE-AMBR. If there is a difference compared to the value that has previously been sent to the RAN node 301, then the MME/SGSN 308 needs to initiate an update to the RAN node 301 with the new updated UE-AMBR.

Step 810

In some embodiments, the PCRF node 320 adjusts the APN-AMBR based on the determined UE-AMBR.

Step 810 is an optional step. An example of when step 810 is not performed is when a user reaches a certain promotion level. The policy implies that UE-AMBR should be increased from e.g. 5 to 20 Mbps. APN-AMBR is 5 Mbps for this APN and may not have to be adjusted (this implies that other PDN-connections may use the "delta" 15 Mbps.

Step 811

This step is performed after step 810. In some embodiments, the PCRF node 320 transmits the adjusted APN-AMBR to a PCEF node, e.g. PGW or GGSN, to be forwarded to the wireless device 305 via the MME/SGSN 308. The adjusted APN-AMBR may be sent over a legacy interface to the PGW/GGSN. However, the PGW/GGSN is not able to tell the difference between an APN-AMBR adjusted based on the calculated UE-AMBR and an APN-AMBR adjusted based on other factors.

Figure 9:
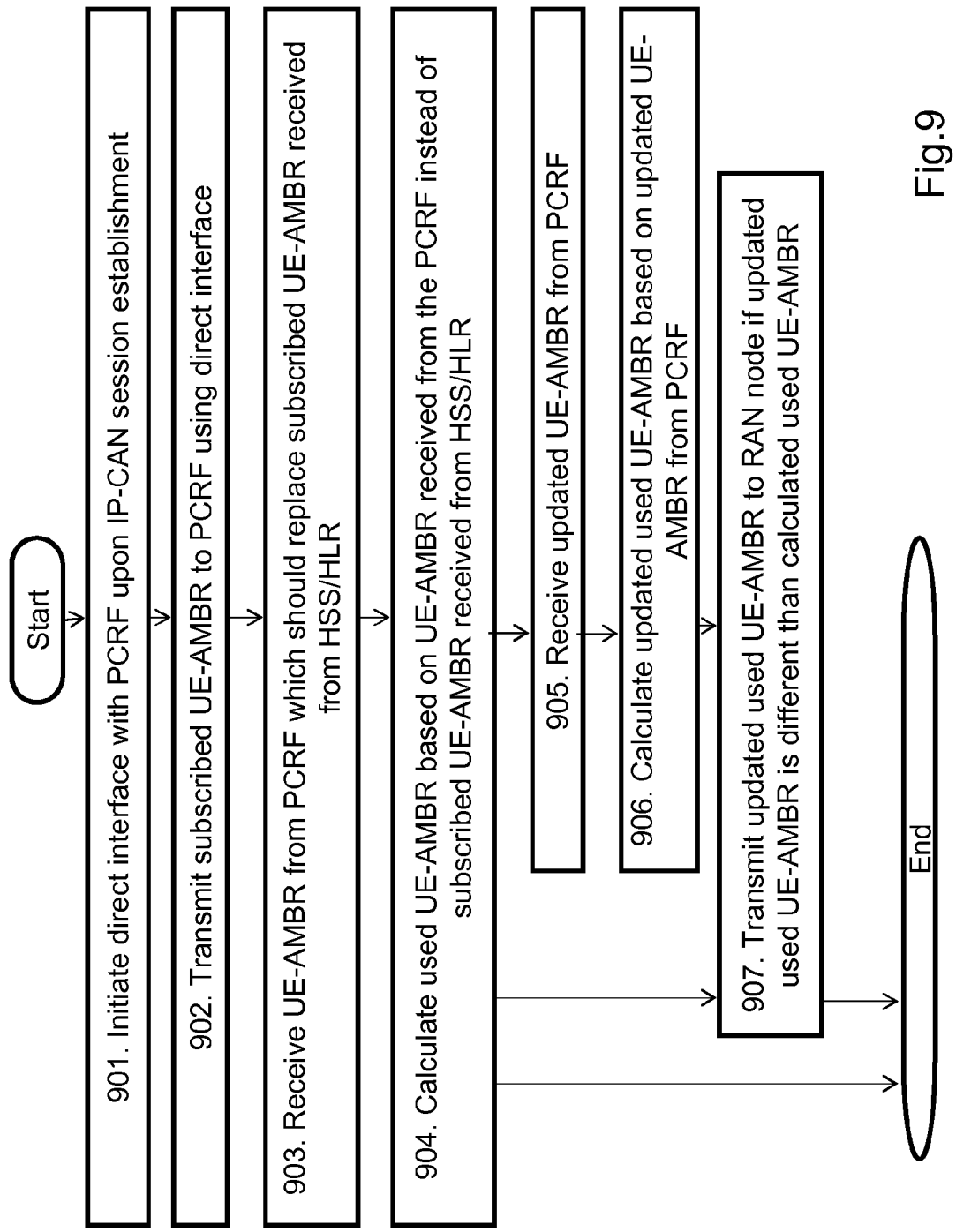
FIG. 9 is a flowchart illustrating embodiments of a method in a MME/SGSN.

The method described above will now be described seen from the perspective of the MME/SGSN 308. FIG. 9 is a flowchart describing the present method in the MME/SGSN 308 for handling UE-AMBR associated with the wireless device 320 in the communications network 300. The MME/SGSN 308 comprises a direct interface 317 with the PCRF node 320. The MME/SGSN 308 comprises a subscribed UE-AMBR received from the HSS/HLR 310 and associated with the wireless device subscription. The subscribed UE-AMBR may be transmitted to the PCRF node 320 in a request for the UE-AMBR. The subscribed UE-AMBR may be received from the HSS/HLR 310 before the direct interface 317 is initiated. The MME/SGSN 308 may be connected to a plurality of PCRF nodes 320. The MME/SGSN 308 may comprise information indicating at least one selected PCRF node 320 of a plurality of PCRF nodes. The at least one selected PCRF node 320 is enabled to change the UE-AMBR. The method comprises the further steps to be performed by the MME/SGSN 308, which steps may be performed in any suitable order than described below:

Step 901

In some embodiments, the MME/SGSN 308 initiates the direct interface 317 with the PCRF node 320 upon an IP-CAN session/PDN-connection establishment.

Step 902

The MME/SGSN 308 transmits the subscribed UE-AMBR to the PCRF node 320 using the direct interface 317. As mentioned earlier, the subscriber UE-AMBR is received in the MME/SGSN 308 prior to the initiation of the direct interface 317, and it is received in the PCRF node 320 after the communication between the MME/SGSN 308 and the PCRF node 308 is initiated.

Step 903

The MME/SGSN 308 receives a UE-AMBR from the PCRF node 320. The UE-AMBR should replace the subscribed UE-AMBR received from the HSS/HLR 310. In some embodiments, the received UE-AMBR is different from the subscribed UE-AMBR or it may be equal to the subscribed UE-AMBR. This may also be described as the MME/SGSN 308 determines to override the subscribed UE-ABMR if the received UE-AMBR is different from the subscribed UE-AMBR, and that it determines to keep the subscribed UE-AMBR if the received UE-AMBR is the same as the subscribed UE-AMBR. Note that the original subscribed UE-AMBR is still saved by the MME/SGSN 308.

Step 904

The MME/SGSN 308 calculates a used UE-AMBR based on the UE-AMBR received from the PCRF node 320 instead of based on the subscribed UE-AMBR received from the HSS/HLR 310.

Step 905

In some embodiments, the MME/SGSN 308 receives an updated UE-AMBR from the PCRF node 320.

The PRCF 320 from which the current UE-AMBR is received is different from another PCRF node from which a previous UE-AMBR has been received.

Step 906

In some embodiments, the MME/SGSN 308 calculates an updated used UE-AMBR based on the updated UE-AMBR.

Step 907

In some embodiments, the MME/SGSN 308 transmits the updated used UE-AMBR to a RAN node 301 if the updated used UE-AMBR is different than the calculated used UE-AMBR. The RAN node 301 may be an eNodeB in case of an LTE network, and a RNC in case of a WCDMA network and a BSC in case of a GERAN network.

Figure 10:
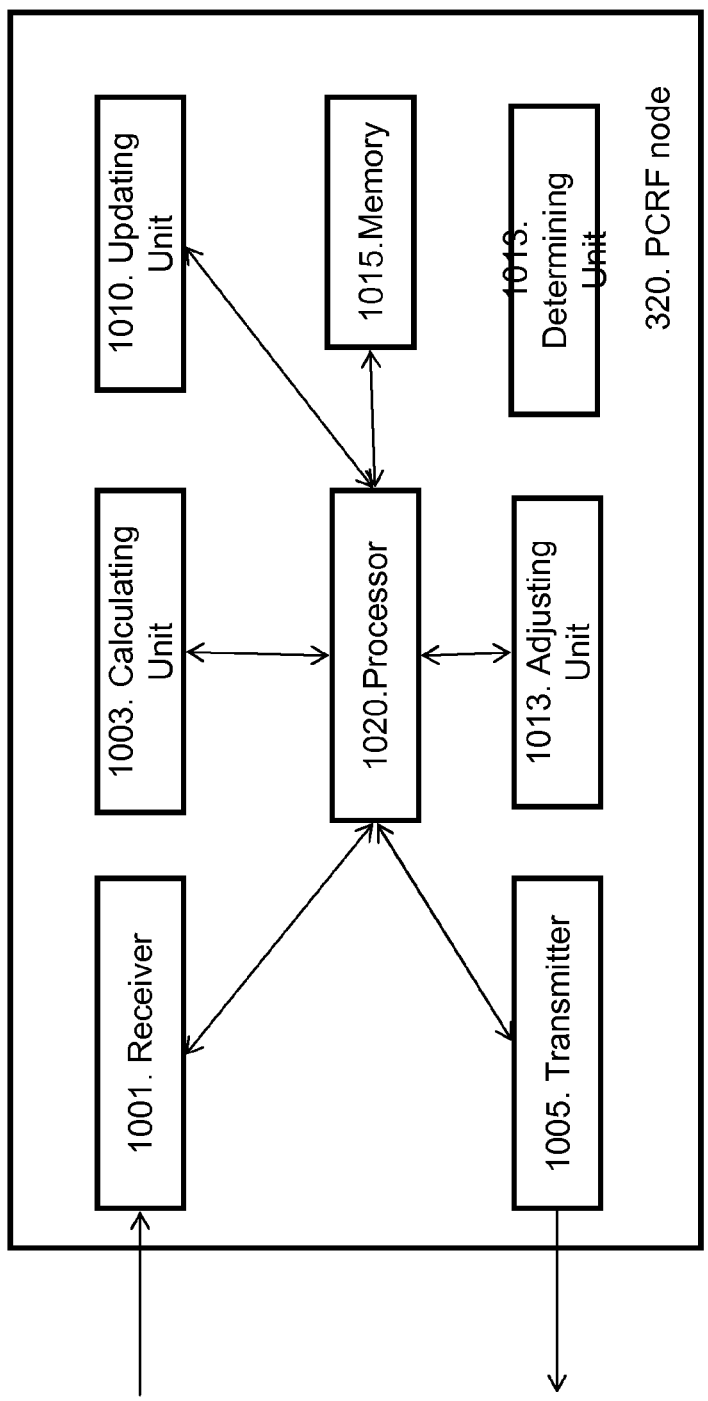
FIG. 10 is a schematic block diagram illustrating embodiments of a PCRF node.

To perform the method steps shown in FIG. 8 for handling UE-AMBR associated with a wireless device 305 in a communications network 300 the PCRF node 320 comprises an arrangement as shown in FIG. 10. As mentioned above, the PCRF node 320 is adapted to comprise a direct interface 317 with the MME/SGSN 308. The PCRF node may comprise an APN-AMBR assigned per APN for the wireless device 305. The APN-AMBR may be assigned in an active PDN connection for a wireless device 305.

The PCRF node 320 comprises a receiver 1001 which is adapted to receive a subscribed UE-AMBR from the MME/SGSN 308 using the direct interface 317. The receiver 1001 may be further adapted to receive a request for the UE-AMBR from the MME/SGSN 308 using the direct interface 317. The request comprises the subscribed UE-AMBR associated with the wireless device 305, and the request triggers the determining unit 1003 to determine the UE-AMBR. The receiver 1001 may be further adapted to receive a message from a network node in the communications network 300. The message comprises information which has an impact on the UE-AMBR, and the receipt of the message triggers the determining unit 1003 to determine the UE-AMBR.

The PCRF node 320 comprises a calculating unit 1003 which is adapted to determine, when triggered, a UE-AMBR based on a subscribed UE-AMBR associated with the wireless device 305. The UE-AMBR may be determined further based on the APN-AMBR. The UE-AMBR may be determined further based on at least one of policies and subscription information received from the SPR 325 and total usage consumed. The UE-AMBR may be determined further based on at least one of information indicating an active PDN connection associated with the wireless device 305 and a previous UE-AMBR determined for a previous PDN connection associated with the wireless device 305. The determined UE-AMBR may be different from the subscribed UE-AMBR or equal to the subscribed UE-AMBR.

In some embodiments, PCRF node 320 comprises a determining unit 1004 which is adapted to determine, based on the internal event, that the PCRF node 320 has previously transmitted a UE-AMBR to the MME/SGSN 308.

The PCRD 320 comprises a transmitter 1005 adapted to transmit the determined UE-AMBR to the MME/SGSN 308 using the direct interface 317. The transmitter 1005 may be further adapted to transmit the updated UE-AMBR to the MME/SGSN 308 without having received any preceding request for the updated UE-AMBR. The transmitter 1005 is further adapted to transmit the adjusted APN-AMBR to a PGW/GGSN to be forwarded to the wireless device 305 via the MME/SGSN 308.

The PCRF node 320 may further comprise a detecting unit 1008 which is adapted to detect an internal event in the PCRF node 320. The internal event has an impact on the UE-AMBR. The detected internal event triggers the determining unit 1003 to determine the UE-AMBR. The internal event is an alternative trigger to the request received by the receiver 1001

The PCRF node 320 may comprise an updating unit 1010 adapted to update the UE-AMBR when it has previously been transmitted to the MME/SGSN 308.

The PCRF node 320 may further comprise an adjusting unit 1013 adapted to adjust the APN-AMBR based on the determined UE-AMBR.

The PCRF node 320 may further comprise a memory 1015 comprising one or more memory units. The memory 1015 is arranged to be used to store data, received data streams, power level measurements, UE-AMBR, subscribed UE-AMBR, APN-AMBR, previously transmitted UE-AMBR, messages, adjusted policies, subscription information, total usage consumed, information indicating active PDN connections, APN-AMBR, requests, information indicating the internal event, threshold values, time periods, configurations, schedulings, and applications to perform the methods herein when being executed in the PCRF node 320.

Those skilled in the art will also appreciate that the receiver 1001, the determining unit 1003, the transmitter 1005, the updating unit 1010 and the adjusting unit 1013 described above may refer to a combination of analog and digital circuits, and/or one or more processors configured with software and/or firmware, e.g. stored in a memory, that when executed by the one or more processors such as the processor 1020 as described below.

Figure 11:
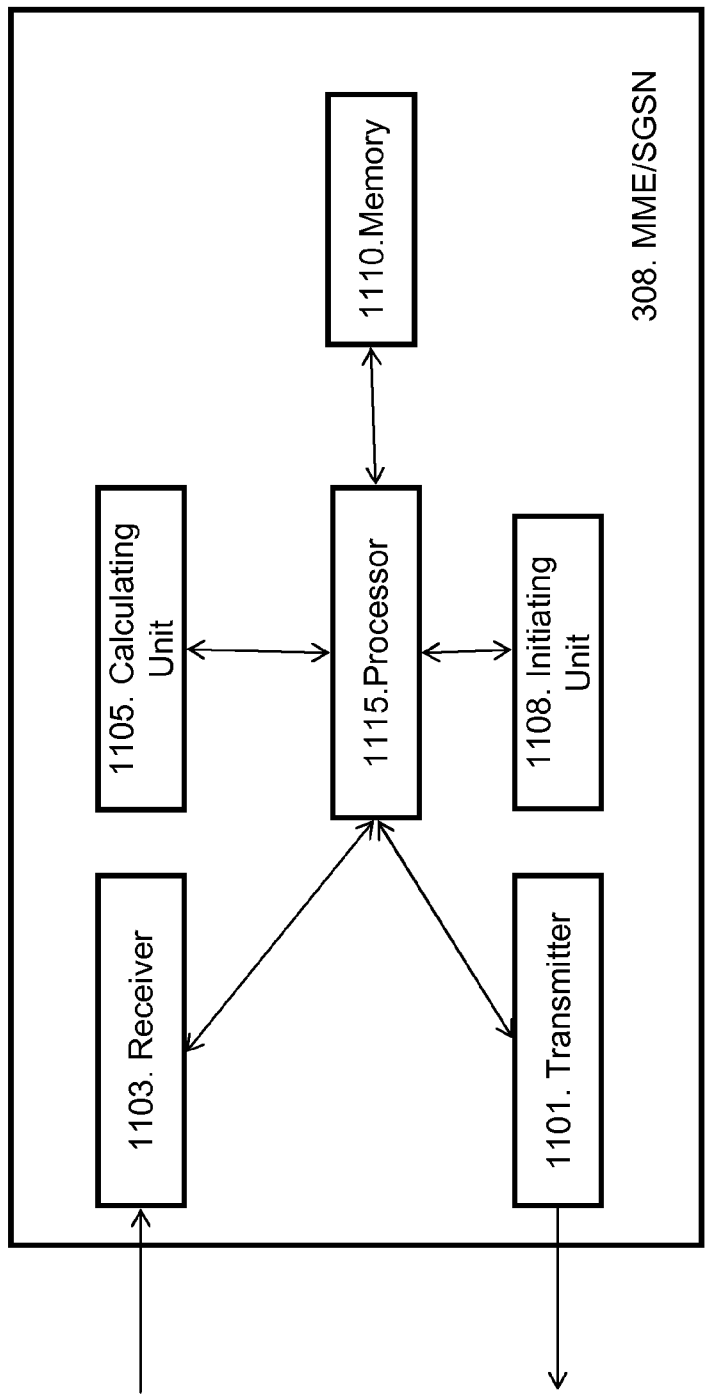
FIG. 11 is a schematic block diagram illustrating embodiments of a MME/SGSN.

To perform the method steps shown in FIG. 9 for handling UE-AMBR associated with a wireless device 305 in a communications network 300 the MME/SGSN 308 comprises an arrangement as shown in FIG. 11. As mentioned above, the MME/SGSN 308 is adapted to have a direct interface 317 with the PCRF node 320. The MME/SGSN 308 comprises a subscribed UE-AMBR received from the HSS/HLR 310. The subscribed UE-AMBR may be received from the HSS/HLR 310 before the direct interface 317 is initiated. In some embodiments, the MME/SGSN 308 is connected to a plurality of PCRF nodes 320.

The MME/SGSN 308 may comprise information indicating at least one selected PCRF node 320 of a plurality of PCRF nodes. The at least one selected PCRF node 320 is enabled to change the UE-AMBR. Since it is the MME/SGSN 308 that initiates the direct interface 317—which is per PDN-connection—it is obvious which PCRF node 320 that is selected for a PDN-connection. However, if e.g. all, just a selected few, or only one PCRF nodes may change the UE-AMBR, this information must be comprised by the MME/SGSN 308 (for example through configuration, but there may be other options).

The MME/SGS 308 comprises a transmitter 1101 which is adapted to transmit the subscribed UE-AMBR to the PCRF node 320 using the direct interface 317. The subscribed UE-AMBR may be transmitted to the PCRF node 320 in a request for the UE-AMBR. The transmitter 1101 may be further adapted to transmit the updated used UE-AMBR to a RAN node 301 if the updated used UE-AMBR is different than the calculated used UE-AMBR.

The MME/SGSN 308 comprises a receiver 1103 which is adapted to receive a UE-AMBR from the PCRF node 320. The UE-AMBR should replace the subscribed UE-AMBR received from the HSS/HLR 310. The receiver 1103 may be further adapted to receive an updated UE-AMBR from the PCRF node 320. In some embodiments, the PRCF from which the UE-AMBR is received is different from another PCRF node from which a previous UE-AMBR has been received.

The MME/SGSN 308 comprises a calculating unit 1105 adapted to calculate a used UE-AMBR based on the UE-AMBR received from the PCRF node 320 instead of the subscribed UE-AMBR received from the HSS/HLR 310. The calculating unit 1105 may be further adapted to calculate an updated used UE-AMBR based on the updated UE-AMBR.

The MME/SGSN 308 may further comprise an initiating unit 1108 adapted to initiate the direct interface with the PCRF node 320 upon an IP-CAN session establishment.

The MME/SGSN 308 may further comprise a memory 1110 comprising one or more memory units. The memory 1110 is arranged to be used to store data, received data streams, power level measurements, received UE-AMBR, subscribed UE-AMBR, updated UE-AMBR, used UE-AMBR, updated used UE-AMBR, APN-AMBR, previously transmitted UE-AMBR, messages, adjusted APN-AMBR, requests, threshold values, time periods, configurations, schedulings, and applications to perform the methods herein when being executed in the MME/SGSN 308.

Those skilled in the art will also appreciate that the transmitter 1101, the receiver 1103, the calculating unit 1105 and the initiating unit 1108 described above may refer to a combination of analog and digital circuits, and/or one or more processors configured with software and/or firmware, e.g. stored in a memory, that when executed by the one or more processors such as the processor 1115 as described below.

The present mechanism for handling UE-AMBR associated with a wireless device 305 in a communications network 300 may be implemented through one or more processors, such as a processor 1020 in the PCRF node arrangement depicted in FIG. 10 and a processor 1115 in the MME/SGSN arrangement depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the PCRF node 320 and/or MME/SGSN 308. One such carrier may be in the form of a CD ROM disc. It is however feasible with other data carriers such as a memory stick. The computer program code may furthermore be provided as pure program code on a server and downloaded to the PCRF node 320 and/or MME/SGSN 308.

The example communications network 300 may further comprise any additional elements suitable to support communication between the network nodes. Although the illustrated PCRF node 320 may represent a network node that comprises any suitable combination of hardware and/or software, this network node may, in particular embodiments represent a network node such as the example PCRF node 320 illustrated in greater detail by FIG. 10. Similarly, although the illustrated MME/SGSN 308 may represent a network node that comprises any suitable combination of hardware and/or software, this network node may, in particular embodiments represent a network node such as the example MME/SGSN 308 illustrated in greater detail by FIG. 11.

From a policy perspective, it is possible for the PCRF node 320 to limit the maximum bandwidth of all non-GBR traffic for different PDN-connections that are targeting different APNs of a wireless device 305. For example, an operator may want to allow simultaneous access to multiple PDNs (e.g. Internet access and virtual private network (VPN)-connectivity) with a fair usage policy that applies across the APNs. Before the usage limit is reached the UE-AMBR should be set to the sum of the APN-AMBR of all active PDN-connection, thus allowing for full speed on all PDN-connections at the same time. After the limit has been reached, the UE-AMBR should be reduced to a lower value, which is possible with the embodiments herein.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "adapted to" used herein may also be referred to as "arranged to" or "configured to".

It should also be emphasized that the steps of the methods defined in the appended claims may, without departing from the embodiments herein, be performed in another order than the order in which they appear in the claims.

The invention claimed is:

1. A method in a Policy and Charging Rules Function (PCRF) node for handling User Equipment-Aggregated Maximum Bit Rate (UE-AMBR) for a wireless device in a communications network, wherein the PCRF node comprises a direct interface with a Mobility Management Entity/Serving General packet radio service Support Node (MME/SGSN), the method comprising:
   receiving a subscribed UE-AMBR from the MME/SGSN using the direct interface, which subscribed UE-AMBR is associated with a wireless device subscription;
   when triggered, calculating a UE-AMBR based on the subscribed UE-AMBR and based policies associated with the wireless device; and
   transmitting the calculated UE-AMBR to the MME/SGSN using the direct interface.

2. The method of claim 1, wherein the trigger comprises:
   receiving a request for the UE-AMBR from the MME/SGSN using the direct interface, which request comprises the subscribed UE-AMBR.

3. The method of claim 1, wherein the trigger comprises:
   detecting an internal event in the PCRF node, which internal event has an impact on the UE-AMBR.

4. The method of claim 3, further comprising:
   based on the internal event, determining that the PCRF node has previously transmitted a UE-AMBR to the MME/SGSN;
   updating the UE-AMBR when it has previously been transmitted to the MME/SGSN; and
   transmitting the updated UE-AMBR to the MME/SGSN without having received any preceding request for the updated UE-AMBR.

5. The method of claim 1, wherein the trigger comprises:
   receiving a message from a network node in the communications network, which message comprises information which has an impact on the UE-AMBR.

6. The method of claim 1, wherein the PCRF node comprises an Access Point Name-Aggregated Maximum Bit Rate, APN-AMBR, assigned per APN for the wireless device;
   wherein the UE-AMBR is determined further based on the APN-AMBR; and wherein the method further comprises:
   adjusting the APN-AMBR based on the determined UE-AMBR; and
   transmitting the adjusted APN-AMBR to a Policy and Charging Enforcement Function, PCEF, node to be forwarded to the wireless device via the MME/SGSN.

7. The method of claim 1, wherein the UE-AMBR is determined further based on at least one of policies and subscription information received from a Subscriber Profile Repository, SPR and total usage consumed and information indicating an active Packet Data Network, PDN, connection associated with the wireless device and a previous UE-AMBR determined for a previous PDN connection associated with the wireless device.

8. The method of claim 1, wherein the calculated UE-AMBR is different from the subscribed UE-AMBR or equal to the subscribed UE-AMBR.

9. A method in a Mobility Management Entity/Serving General packet radio service Support Node (MME/SGSN) for handling User Equipment-Aggregated Maximum Bit Rate (UE-AMBR) of a wireless device in a communications network, wherein the MME/SGSN comprises a direct interface with a Policy and Charging Rules Function (PCRF) node, wherein the MME/SGSN comprises a subscribed UE-AMBR received from a Home Subscriber Server/Home Location Register, HSS/HLR, which subscribed UE-AMBR is associated with a wireless device subscription; the method comprising:
    transmitting the subscribed UE-AMBR to the PCRF node using the direct interface;
    receiving a UE-AMBR from the PCRF node; and
    calculating a used UE-AMBR based on the UE-AMBR received from the PCRF node.

10. The method of claim 9, wherein the subscribed UE-AMBR is transmitted to the PCRF node in a request for the UE-AMBR.

11. The method of claim 9, further comprising:
    receiving an updated UE-AMBR from the PCRF node;
    calculating an updated used UE-AMBR based on the updated UE-AMBR; and
    transmitting the updated used UE-AMBR to a radio access network, RAN, node if the updated used UE-AMBR is different than the calculated used UE-AMBR.

12. The method of claim 9, further comprising:
    initiating the direct interface with the PCRF node upon an Internet Protocol-Connectivity Access Network, IP-CAN, session establishment; and
    wherein the subscribed UE-AMBR is received from the HSS/HLR before the direct interface is initiated.

13. The method of claim 9, wherein the MME/SGSN is connected to a plurality of PCRF nodes, and wherein the PRCF from which the UE-AMBR is received is another PCRF node than a PCRF node from which a previous UE-AMBR has been received.

14. The method of claim 9, wherein the MME/SGSN comprises information indicating at least one selected PCRF node of a plurality of PCRF nodes, which at least one selected PCRF node is enabled to change the UE-AMBR.

15. A Policy and Charging Rules Function (PCRF) node, for handling User Equipment-Aggregated Maximum Bit Rate (UE-AMBR) associated with a wireless device in a communications network, wherein the PCRF node is adapted to comprise a direct interface with a Mobility Management Entity/Serving General packet radio service Support Node, MME/SGSN, the PCRF node comprises:
    a receiver adapted to receive a subscribed UE-AMBR from the MME/SGSN using the direct interface, which subscribed UE-AMBR is associated with a wireless device subscription;
    a calculating unit adapted to calculate, when triggered, a UE-AMBR based on the subscribed UE-AMBR and based policies associated with the wireless device; and
    a transmitter adapted to transmit the calculated UE-AMBR to the MME/SGSN using the direct interface.

16. The PCRF node of claim 15, wherein the receiver is further adapted to receive a request for the UE-AMBR from the MME/SGSN using the direct interface, which request comprises the subscribed UE-AMBR, and which request triggers the calculating unit to determine the UE-AMBR.

17. The PCRF node of claim 15, further comprises:
    a detecting unit adapted to detect an internal event in the PCRF node and wherein the internal event has an impact on the UE-AMBR, and wherein the detected internal event triggers the calculating unit to determine the UE-AMBR.

18. The PCRF node of claim 15, further comprises:
    a determining unit further adapted to determine, based on the internal event, that the PCRF node has previously transmitted a UE-AMBR to the MME/SGSN; and
    an updating unit adapted to update the UE-AMBR when it has previously been transmitted to the MME/SGSN; and wherein
    the transmitter is further adapted to transmit the updated UE-AMBR to the MME/SGSN without having received any preceding request for the updated UE-AMBR.

19. The PCRF node of claim 15, wherein the receiver is further adapted to receive a message from a network node in the communications network, which message comprises information which has an impact on the UE-AMBR, and which receipt of the message triggers the determining unit to determine the UE-AMBR.

20. The PCRF node of claim 15, wherein the PCRF node comprises an Access Point Name-Aggregated Maximum Bit Rate, APN-AMBR, assigned per APN for the wireless device; wherein the UE-AMBR is determined further based on the APN-AMBR; and wherein the method further comprises:
    an adjusting unit adapted to adjust the APN-AMBR based on the determined UE-AMBR; and
    wherein the transmitter is further adapted to transmit the adjusted APN-AMBR to a Policy and Charging Enforcement Function, PCEF, node to be forwarded to the wireless device via the MME/SGSN.

21. The PCRF node of claim 15, wherein the UE-AMBR is determined further based on at least one of policies and subscription information received from a Subscriber Profile Repository, SPR and total usage consumed,
    and information indicating an active Packet Data Network, PDN, connection associated with the wireless device and a previous UE-AMBR determined for a previous PDN connection associated with the wireless device.

22. The PCRF node of claim 15, wherein the determined UE-AMBR is different from the subscribed UE-AMBR or equal to the subscribed UE-AMBR.

23. A Mobility Management Entity/Serving General packet radio service Support Node (MME/SGSN) for handling User Equipment-Aggregated Maximum Bit Rate (UE-AMBR) associated with a wireless device in a communications network, wherein the MME/SGSN is adapted to have a direct interface with a Policy and Charging Rules Function, PCRF node, wherein the MME/SGSN comprises a subscribed UE-AMBR received from a Home Subscriber Server/Home Location Register, HSS/HLR, which subscribed UE-AMBR is associated with a wireless device subscription, wherein the MME/SGSN comprises:
    a transmitter adapted to transmit the subscribed UE-AMBR to the PCRF node using the direct interface;
    a receiver adapted to receive a UE-AMBR from the PCRF node; and
    a calculating unit adapted to calculate a used UE-AMBR based on the UE-AMBR received from the PCRF node.

24. The MME/SGSN of claim 23, wherein the subscribed UE-AMBR is transmitted to the PCRF node in a request for the UE-AMBR.

25. The MME/SGSN of claim 23, wherein
the receiver is further adapted to receive an updated UE-AMBR from the PCRF node; wherein
the calculating unit is further adapted to calculate an updated used UE-AMBR based on the updated UE-AMBR; and wherein
the transmitter is further adapted to transmit the updated used UE-AMBR to a radio access network, RAN, node if the updated used UE-AMBR is different than the calculated used UE-AMBR.

26. The MME/SGSN of claim 23, further comprising:
an initiating unit adapted to initiate the direct interface with the PCRF node upon an Internet Protocol-Connectivity Access Network, IP-CAN, session establishment; and wherein the subscribed UE-AMBR is received from the HSS/HLR before the direct interface-is initiated.

27. The MME/SGSN of claim 23, wherein the MME/SGSN is connected to a plurality of PCRF nodes, and wherein the PRCF from which the UE-AMBR is received is another PCRF node than the PCRF node from which a previous UE-AMBR has been received.

28. The MME/SGSN of claim 23, wherein the MME/SGSN comprises information indicating at least one selected PCRF node of a plurality of PCRF nodes, which at least one selected PCRF node is enabled to change the UE-AMBR.

\* \* \* \* \*

UNITED STATES PATENT AND TRADEMARK OFFICE
CERTIFICATE OF CORRECTION

Page 1 of 2

PATENT NO.      : 9,560,212 B2
APPLICATION NO. : 14/784486
DATED           : January 31, 2017
INVENTOR(S)     : Stenfelt et al.

It is certified that error appears in the above-identified patent and that said Letters Patent is hereby corrected as shown below:

In the Drawings

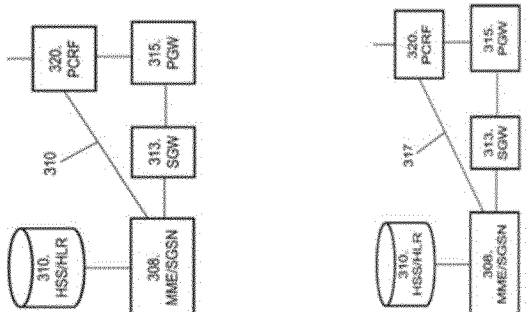

In Fig. 3, Sheet 3 of 11, delete " " and insert -- -- , therefor.

Figure 7:
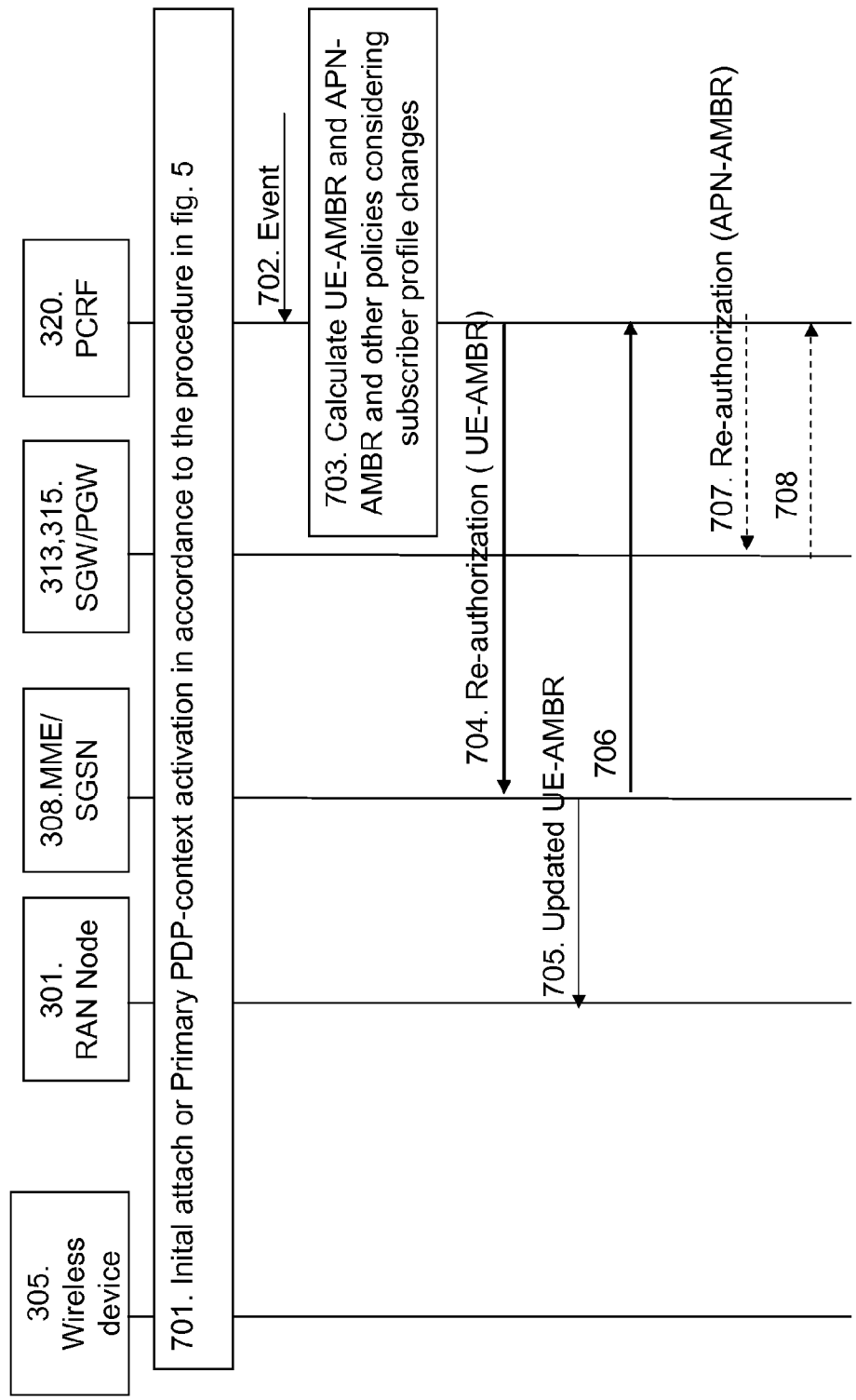
FIG. 7 is a signaling diagram illustrating embodiments of a method in a communications network for reauthorization, change of UE-AMBR upon subscriber profile change.

In Fig. 7, Sheet 7 of 11, in Step "701", Line 1, delete "Inital" and insert -- Initial --, therefor.

In the Specification

In Column 4, Line 35, delete "APN_AMBR" and insert -- APN-AMBR --, therefor.

In Column 13, Line 5, delete "UE AMBR." and insert -- UE-AMBR. --, therefor.

In Column 14, Line 7, delete "wireless device 320" and insert -- wireless device 305 --, therefor.

In Column 15, Line 54, delete "(this" and insert -- this --, therefor.

In Column 16, Lines 2-3, delete "wireless device 320" and insert -- wireless device 305 --, therefor.

In Column 16, Line 53, delete "PRCF" and insert -- PCRF --, therefor.

Signed and Sealed this
Sixteenth Day of June, 2020

Andrei Iancu
*Director of the United States Patent and Trademark Office*

CERTIFICATE OF CORRECTION (continued)
U.S. Pat. No. 9,560,212 B2

In Column 17, Line 54, delete "1001" and insert -- 1001. --, therefor.

In Column 18, Line 48, delete "PRCF" and insert -- PCRF --, therefor.

In the Claims

In Column 20, Line 66, in Claim 7, delete "SPR" and insert -- SPR, --, therefor.

In Column 21, Line 42, in Claim 13, delete "PRCF" and insert -- PCRF --, therefor.

In Column 22, Line 42, in Claim 21, delete "SPR" and insert -- SPR, --, therefor.

In Column 23, Line 23, in Claim 27, delete "PRCF" and insert -- PCRF --, therefor.